(12) United States Patent
Jung et al.

(10) Patent No.: US 11,113,499 B2
(45) Date of Patent: Sep. 7, 2021

(54) FINGERPRINT RECOGNITION DEVICE AND A DRIVING METHOD THEREOF

(71) Applicant: SAMSUNG DISPLAY CO., LTD., Yongin-si (KR)

(72) Inventors: Keum Dong Jung, Seoul (KR); Il Nam Kim, Hwaseong-si (KR); Kyung Tea Park, Seoul (KR); Jin Oh Kwag, Suwon-si (KR); Won Sang Park, Yongin-si (KR); Sung Chan Jo, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 10 days.

(21) Appl. No.: 16/545,180

(22) Filed: Aug. 20, 2019

(65) Prior Publication Data
US 2020/0065541 A1    Feb. 27, 2020

(30) Foreign Application Priority Data
Aug. 21, 2018  (KR) .......................... 10-2018-0097274

(51) Int. Cl.
*G06K 9/00*    (2006.01)
(52) U.S. Cl.
CPC ......... *G06K 9/0002* (2013.01); *G06K 9/0008* (2013.01); *G06K 9/00053* (2013.01); *G06K 9/00087* (2013.01); *G06K 9/00107* (2013.01)

(58) Field of Classification Search
CPC ............. G06K 9/0002; G06K 9/00053; G06K 9/0008; G06K 9/00087; G06K 9/00107
See application file for complete search history.

(56) References Cited

U.S. PATENT DOCUMENTS

| 2017/0017340 | A1* | 1/2017 | Liu ...................... G06F 3/04184 |
| 2017/0249494 | A1* | 8/2017 | Zhang ................... G06F 1/1684 |
| 2019/0095669 | A1  | 3/2019 | Jung et al. |

FOREIGN PATENT DOCUMENTS

| KR | 10-2016-0141259 | 12/2016 |
| KR | 10-2017-0081017 | 7/2017 |
| KR | 10-2019-0036005 | 4/2019 |

* cited by examiner

*Primary Examiner* — Stephen G Sherman
(74) *Attorney, Agent, or Firm* — F. Chau & Associates, LLC

(57) ABSTRACT

A fingerprint recognition device including: a sensing panel including a plurality of sensing blocks, wherein each of the sensing blocks includes a plurality of sensors; a scan driving unit configured to provide a scan signal to the sensors; and a timing controller configured to provide a second initiation signal to the scan driving unit, wherein each of the sensors includes a reference capacitor and a sensing capacitor, the scan driving unit includes scan drivers that correspond to rows of the sensing blocks, in a fingerprint recognition mode, the timing controller provides the second initiation signal to a scan driver corresponding to a sensing block where a touch input is generated, and in a touch mode, the timing controller sequentially provides the second initiation signal to the scan drivers.

7 Claims, 16 Drawing Sheets

FINGERPRINT RECOGNITION DEVICE AND A DRIVING METHOD THEREOF

CROSS-REFERENCE TO RELATED APPLICATION

This application claims priority under 35 U.S.C. § 119 to Korean Patent Application No. 10-2018-0097274, filed on Aug. 21, 2018, the disclosure of which is incorporated by reference herein in its entirety.

TECHNICAL FIELD

The present inventive concept relates to a fingerprint recognition device, and more particularly, to a fingerprint recognition device including self-capacitance or optical fingerprint sensors.

DESCRIPTION OF THE RELATED ART

Computer-based systems for various purposes, such as laptop computers, tablet personal computers (PCs), smartphones, personal digital assistants (PDAs), automated teller machines (ATMs), search guidance systems, etc., have been developed. Since the computer-based systems store various confidential data such as personal information, business information or trade secrets, there is the need to protect such confidential data. To accomplish this, fingerprint sensors have been developed.

Fingerprint sensors are sensors capable of sensing human fingerprints. Fingerprint sensors may be classified as an optical fingerprint sensor or a capacitive fingerprint sensor. The optical fingerprint sensor detects a fingerprint by emitting light using a light source such as a light-emitting diode (LED) and sensing light reflected from the ridges and valleys of a finger via a complementary metal-oxide-semiconductor (CMOS) image sensor. The capacitive fingerprint sensor detects a fingerprint by using a capacitance generated between the capacitive fingerprint sensor and a ridge or a valley of a finger in contact with the capacitive fingerprint sensor.

SUMMARY

According to an exemplary embodiment of the present inventive concept, a fingerprint recognition device comprises a sensing panel including a plurality of sensing blocks, wherein each of the sensing blocks includes a plurality of sensors; a scan driving unit configured to provide a scan signal to the sensors; and a timing controller configured to provide a second initiation signal to the scan driving unit, wherein each of the sensors includes a reference to capacitor and a sensing capacitor, the scan driving unit includes scan drivers that correspond to rows of the sensing blocks, in a fingerprint recognition mode, the timing controller provides the second initiation signal to a scan driver corresponding to a sensing block where a touch input is generated, and in a touch mode, the timing controller sequentially provides the second initiation signal to the scan drivers.

The reference capacitor may have a fixed capacitance, and the sensing capacitor may have a variable capacitance that varies depending on a distance to a fingerprint.

The fingerprint recognition device may further comprise an emission driving unit configured to receive a first initiation signal from the timing controller and provide an emission signal to the sensors.

In the touch mode, the timing controller may provide an on-state mode signal to the scan driving unit, and in the fingerprint recognition mode, the timing controller may provide an off-state mode signal to the scan driving unit.

In the fingerprint recognition mode, the emission driving unit sequentially may provide the emission signal to the sensors, and the scan driving unit sequentially may provide the scan signal to the sensors.

The first initiation signal may be provided before the second initiation signal, and the emission signal may be provided before the scan signal.

The first initiation signal may include at least three consecutive pulses, and the second initiation signal may be provided when a last pulse of the first initiation signal is provided.

In the touch mode, the emission driving unit and the scan driving unit may provide the emission signal and the scan signal to the sensors at the same time.

The emission driving unit and the scan driving unit may provide the emission signal and the scan signal only to some of the sensors.

The timing controller may provide first and second emission clock signals having to opposite phases with respect to each other to the scan driving unit and provides first and second scan clock signals having opposite phases with respect to each other to the scan driving unit, the first and second emission clock signals include sections modulated into high frequencies, and the first and second scan clock signals include sections modulated into high frequencies.

The timing controller may provide an enable signal to the emission driving unit and the scan driving unit, and when the enable signal is turned off, all operations of the emission driving unit and the scan driving unit may be terminated.

According to another exemplary embodiment of the present inventive concept, a fingerprint recognition device comprises a sensing panel including a plurality of sensing blocks, wherein each of the sensing blocks includes a plurality of sensors; a scan driving unit configured to provide a scan signal to the sensors; and a timing controller configured to provide an initiation signal to the scan driving unit, wherein each of the sensors includes a photoelectric conversion element, the scan driving unit includes scan drivers that correspond to rows of the sensing blocks, in a first mode, the timing controller sequentially provides the initiation signal to the scan drivers, and in a second mode, the timing controller provides the initiation signal to a scan driver corresponding to a sensing block where touch input is generated.

In the second mode, the scan driving unit may receive the initiation signal and may sequentially provide the scan signal to the sensors.

The timing controller may receive a touch signal from a touch sensing unit, may detect touch coordinates from the touch signal, and may provide the initiation signal only to a scan driver corresponding to a sensing block that corresponds to the detected touch coordinates.

The touch sensing unit may be disposed on a display panel, and the sensing panel may be attached to a bottom of the display panel.

The timing controller may provide the initiation signal to at least one scan driver adjacent to the scan driver corresponding to the sensing block that corresponds to the detected to touch coordinates.

In the first mode, the scan driving unit may provide the scan signal to the sensors at the same time.

According to another exemplary embodiment of the present inventive concept a driving method of a fingerprint recognition device comprising a sensing panel including a plurality of sensing blocks each including a plurality of sensors, an emission driving unit for providing an emission signal to the sensors, a scan driving unit for providing a scan signal to the sensors, and a timing controller for providing a first initiation signal to the emission driving unit and for providing a second initiation signal to the scan driving unit, the driving method comprises receiving a touch input at the sensing panel; determining, by the timing controller, whether a mode signal is on or off; and driving the fingerprint recognition device in a fingerprint recognition mode when the mode signal is off and driving the fingerprint recognition device in a touch mode when the mode signal is on.

The driving of the fingerprint recognition device in the fingerprint recognition mode, comprises sequentially providing, by the timing controller, the first initiation signal to the emission driving unit, sequentially providing, by the emission driving unit, the emission signal to the sensors, providing, by the timing controller, the second initiation signal to the scan driving unit, sequentially providing, by the scan driving unit, the scan signal to the sensors, and turning off, by the timing controller, an enable signal, and the first and second initiation signals may be provided to an emission driver and a scan driver both corresponding to a row including a sensing block where the touch input is generated.

The driving of the fingerprint recognition device in the touch mode, comprises turning on, by the timing controller, the enable signal, providing, by the timing controller, the first and second initiation signals to the scan driving unit and the emission driving unit at the same time, providing, by the emission driving unit and the scan driving unit, the emission signal and the scan signal to the sensors at the same time, and turning off, by the timing controller, the enable signal, and the first and second initiation signals may be sequentially provided to emission drivers that are disposed to correspond to rows of the sensing blocks and to scan drivers that are also disposed to correspond to the rows of the sensing blocks.

BRIEF DESCRIPTION OF THE DRAWINGS

The above and other features of the present inventive concept will become more apparent by describing in detail exemplary embodiments thereof with reference to the attached drawings, in which.

DETAILED DESCRIPTION OF THE EMBODIMENTS

Figure 1:
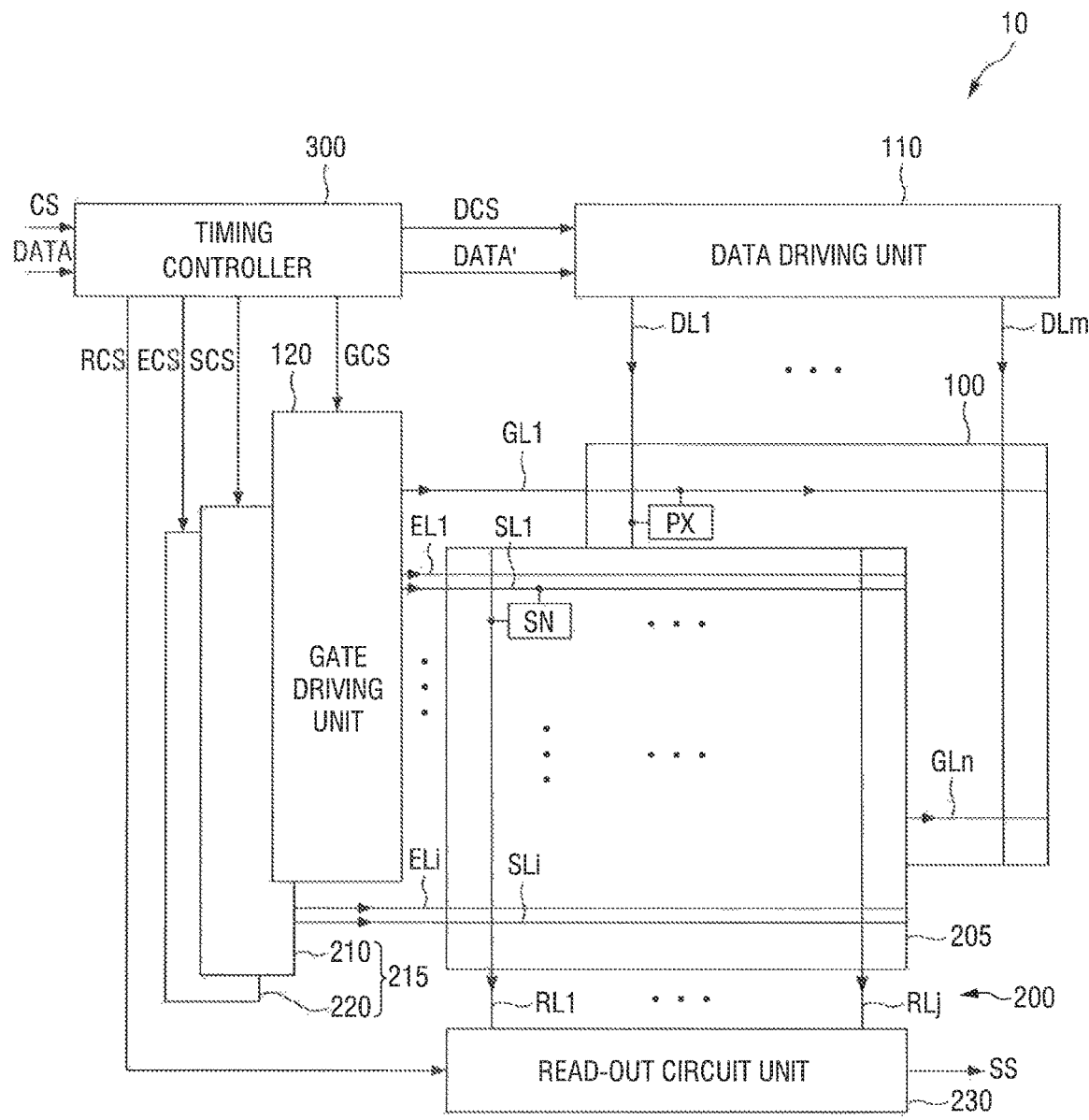
FIG. 1 is a block diagram of a display device according to an exemplary embodiment of the present inventive concept.

Exemplary embodiments of the present inventive concept will be described more fully hereinafter with reference to the accompanying drawings. The present inventive concept may, however, be embodied in many different forms and should not be construed as being limited to the embodiments set forth herein.

As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected or coupled to the other element or layer or intervening elements or layers may be present.

In the drawings, components may be exaggerated or reduced in size for convenience of explanation.

Throughout the specification, like reference numerals may refer to like elements.

Figure 2:
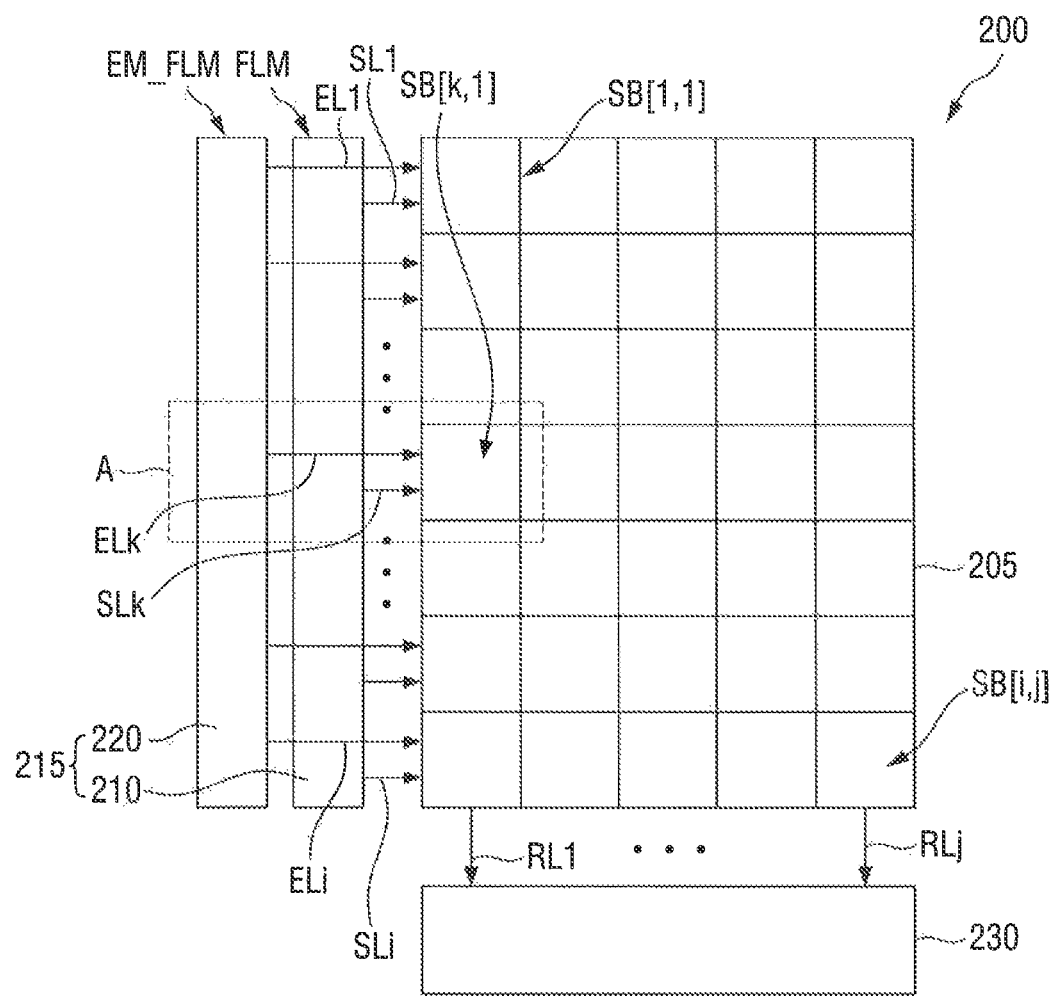
FIG. 2 is a block diagram of a fingerprint recognition device according to an exemplary embodiment of the present inventive concept.
Figure 3:
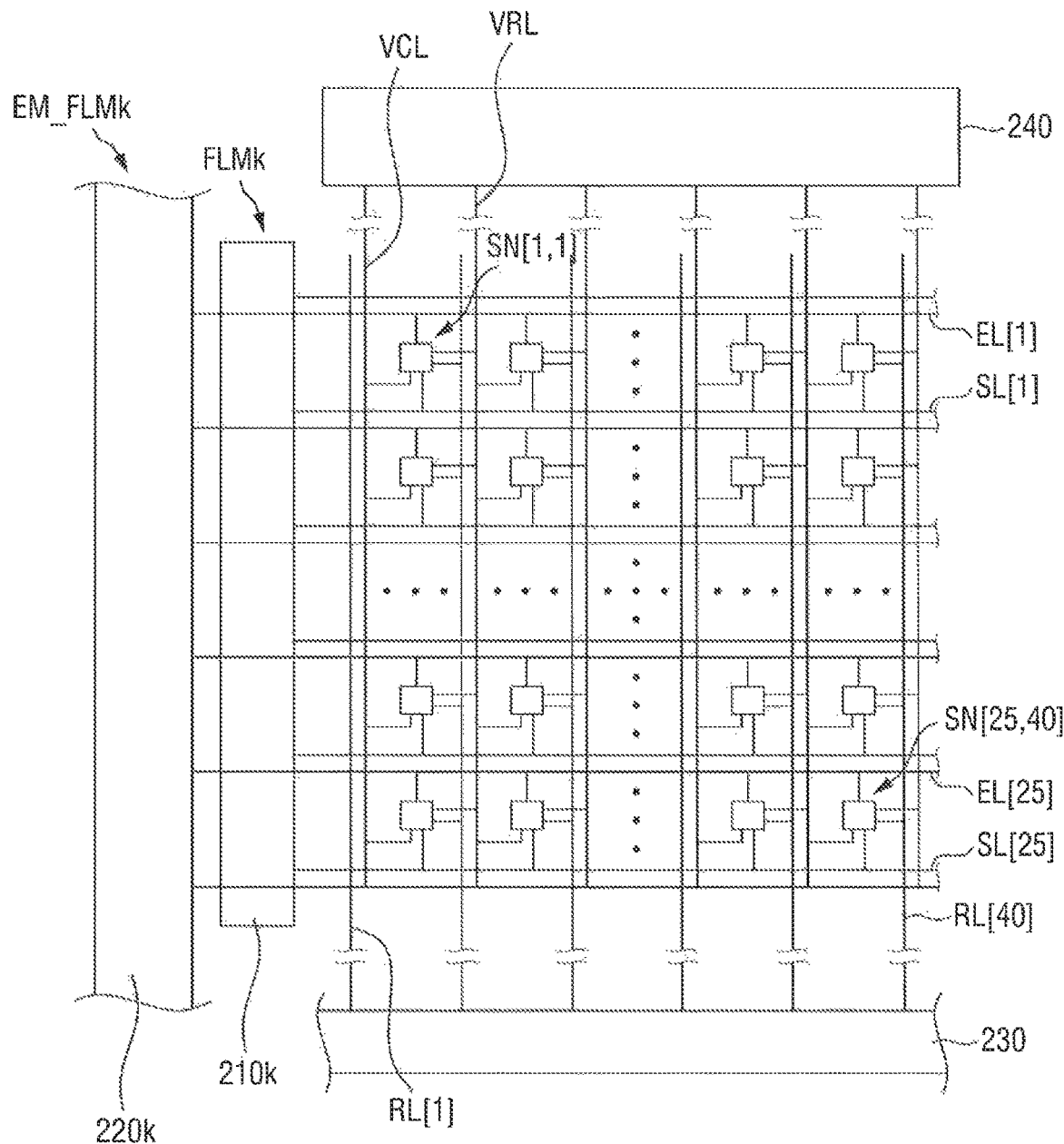
FIG. 3 is an enlarged view of an area A of FIG. 2.

FIG. 1 is a block diagram of a display device according to an exemplary embodiment of the present inventive concept. FIG. 2 is a block diagram of a fingerprint recognition device according to an exemplary embodiment of the present inventive concept. FIG. 3 is an enlarged view of an area A of FIG. 2.

Referring to FIGS. 1 through 3, a display device 10 may include a display panel 100, a data driving unit 110, a gate driving unit 120, a sensing panel 205, a sensing driving unit 215, a read-out circuit unit 230, and a timing controller 300. A fingerprint recognition device 200 may include the sensing panel 205, the sensing driving unit 215, the read-out circuit unit 230, and the timing controller 300. The sensing driving unit 215 may include a scan driving unit 210 and an emission driving unit 220. The timing controller 300 may provide various control signals to the display panel 100 and the fingerprint recognition device 200.

The display panel 100 may include a plurality of pixels PX and may provide an image to the outside. The display panel 100 may be an organic light-emitting diode (OLED) display panel including OLEDs. In the description that follows, it is assumed that the display panel 100 is an OLED display panel, but the present inventive concept is not limited thereto. Alternatively, the display panel 100 may be a liquid crystal display (LCD) panel or a micro light-emitting diode (mLED) display panel.

In the display panel 100, data lines DL1 through DLm (where m is a positive integer of 2 or greater) and gate lines GL1 through GLn (where n is a positive integer of 2 or greater) may be disposed. The data lines DL1 through DLm and the gate lines GL1 through GLn may intersect one another. Each of the pixels PX of the display panel 100 may be connected to one of the data lines DL1 through DLm and one of the gate lines GL1 through GLn. Each of the pixels PX may include a driving transistor, a switching transistor, which is controlled by a gate signal from one of the gate lines GL1 through GLn, a light-emitting element, and a capacitor. The driving transistor and the switching transistor may be thin-film transistors (TFTs).

The data driving unit 110 is connected to the data lines DL1 through DLm and provides data voltages to the pixels PX. The data driving unit 110 may receive digital video data DATA' and a data control signal DCS from the timing controller 300. The data driving unit 110 may convert the digital video data DATA' into data voltages in accordance with the data control signal DCS and may provide the data voltages to the data lines DL1 through DLm.

The gate driving unit 120 is connected to the gate lines GL through GLn and provides gate voltages to the pixels PX. The gate driving unit 120 may receive a gate control signal GCS from the timing controller 300. The gate driving unit 120 may sequentially provide gate voltages to the gate lines GL1 through GLn in accordance with the gate control signal GCS.

The timing controller 300 receives multiple image signals DATA and multiple control signals CS from outside the display device 10. The timing controller 300 may generate image signals DATA' (also referred to as digital video data) by converting the data format of the image signals DATA to be compatible with the interface specification of the data driving unit 110 and may provide the image signals DATA' to the data driving unit 110. The timing controller 300 may provide the data control signal DCS to the data driving unit 110.

The timing controller 300 may provide various control signals to various driving units. For example, the timing controller 300 may generate the gate control signal GCS and provide the gate control signal GCS to the gate driving unit 120. In addition, the timing controller 300 may generate a scan control signal SCS and an emission control signal ECS, provide the scan control signal SCS to the scan driving unit 210, and provide the emission control signal ECS to the emission driving unit 220. For example, the timing controller 300 may generate a read-out control signal RCS, provide the read-out control signal RCS to the read-out circuit unit 230, and receive fingerprint sensing signals SS from the read-out circuit unit 230.

The fingerprint recognition device 200 may include the sensing panel 205, the sensing driving unit 215, the read-out circuit unit 230, and the timing controller 300.

The sensing panel 205 may include a plurality of sensors SN. The sensors SN may be fingerprint sensors for performing a fingerprint recognition operation. The fingerprint sensors may be capacitive fingerprint sensors or optical fingerprint sensors, but the present inventive concept is not limited thereto. Alternatively, the fingerprint sensors may be ultrasonic fingerprint sensors or infrared fingerprint sensors. In a case where the sensors SN are capacitive fingerprint sensors, the sensors SN may detect a fingerprint using the difference in the amount of an electrical charge between the sensors SN and ridges and valleys of a finger that are in contact with the sensors SN. In a case where the sensors SN are optical fingerprint sensors, the sensors SN may detect a fingerprint by applying light with light sources (such as light-emitting diodes (LEDs)) provided therein and detecting light reflected from ridges and valleys of a finger with complementary metal-oxide-semiconductor (CMOS) image sensors. In the description that follows, it is assumed that the sensors SN are self-capacitive fingerprint sensors. A display sensor having optical fingerprint sensors will be described later with reference to FIGS. 13 through 15.

In the sensing panel 205, a plurality of scan lines (SL1 through SLi where i is a positive integer of 2 or greater), a plurality of emission lines (EL1 through ELi where i is a positive integer of 2 or greater), and a plurality of read-out lines (RL1 through RLj where j is a positive integer of 2 or greater) may be disposed. The scan lines (SL1 through SLi) and the emission lines (EL1 through ELi) may be disposed in parallel to one another. The read-out lines (RL1 through RLj) may be disposed to intersect the scan lines (SL1 through SLi) and the emission lines (EL1 through ELi). Each of the sensors SN of the sensing panel 205 may be connected to one of the scan lines (SL1 through SLi), one of the emission lines (EL1 through ELi), and one of the read-out lines (RL1 through RLj). Each of the sensors SN may include a plurality of switching transistors and a capacitor, which are controlled by a scan signal from one of the scan lines (SL1 through SLi) and an emission signal from one of the emission lines (EL1 through ELi). The switching transistors of each of the sensors SN may be TFTs.

The sensing driving unit 215 may include the scan driving unit 210 and the emission driving unit 220. The sensing driving unit 215 may receive sensing control signals from the timing controller 300 and may sequentially provide a scan signal and an emission signal to the sensing panel 205 based on the sensing control signals. The sensing control signals may include the scan control signal SCS and the emission control signal ECS.

The scan driving unit 210 is connected to the scan lines (SL1 through SLi) and provides a scan signal to the sensors SN of the sensing panel 205. The scan driving unit 210 may receive the scan control signal SCS from the timing controller 300. The scan control signal SCS may include a second initiation signal FLM and may control the scan driving unit 210. The scan driving unit 210 may sequentially provide a scan signal to the scan lines (SL1 through SLi) in accordance with the scan control signal SCS.

The emission driving unit 220 is connected to the emission lines (EL1 through ELi) and provides an emission signal to the sensors SN of the sensing panel 205. The emission driving unit 220 may receive the emission control signal ECS from the timing controller 300. The emission control signal ECS may include a first initiation signal EM_FLM and may control the emission driving unit 220. The emission driving unit 220 may sequentially provide an emission signal to the emission lines (EL1 through ELi) in accordance with the emission control signal ECS.

The scan driving unit 210 and the emission driving unit 220 may be formed on the sensing panel 205 in a gate driver-in-panel (GIP) manner. The scan driving unit 210 and the emission driving unit 220 may be disposed on one side of the sensing panel 205. Alternatively, one pair of the scan driving unit 210 and the emission driving unit 220 may be disposed on one side of the sensing panel 205, and another pair of the scan driving unit 210 and the emission driving unit 220 may be disposed on the other side of the sensing panel 205. In yet another alternative, the scan driving unit 210 may be disposed on one side of the sensing panel 205, and the emission driving unit 220 may be disposed on the other side of the sensing panel 205.

The read-out circuit unit 230 may sequentially provide the fingerprint sensing signals SS, received from the read-out lines (RL1 through RLj), to the timing controller 300 in response to the read-out control signal RCS received from the timing controller 300. The timing controller 300 may create a fingerprint image based on the times when a scan signal and an emission signal are generated and based on the fingerprint sensing signals SS received from the read-out circuit unit 230. The read-out circuit unit 230 may be disposed on the opposite side of the sensing panel 205 with respect to the scan driving unit 210 and the emission driving unit 220.

For convenience, FIG. 2 illustrates some of the scan lines (SL1 through SLi), some of the emission lines (EL1 through ELi), and some of the read-out lines (RL1 through RLj). The sensing panel 205 may include, and may be divided into, a plurality of sensing blocks SB (SB[1,1] through SB[i,j] where i and j are positive integers of 2 or greater). The sensing blocks SB may be arranged in rows and columns, and the locations of the sensing blocks SB may be represented in rows and columns. For example, an i-th row, j-th column sensing block SB may be represented as SB[i,j].

Each of the sensing blocks SB may include multiple sensors SN. The sensing blocks SB may have a size compatible with the touch system of the display device 10. For example, the sensing blocks SB may have a square shape having a length of 4 mm in a first direction d1 and a length of 4 mm in a second direction d2. The size of the sensing blocks SB is not particularly limited, but may vary as necessary. The number of sensors SN provided in each of the sensing blocks SB may vary depending on the size of the sensing blocks SB. The fingerprint recognition device 200 may control a particular number of sensing blocks SB via the timing controller 300. For example, in a case where two rows of sensing blocks SB are driven for fingerprint recognition depending on the location of a touch input, an 8-mm long fingerprint recognition area can be secured. In another example, in a case where three rows of sensing blocks SB are driven for fingerprint recognition, a 12-mm long fingerprint recognition area can be secured. The number of sensing blocks SB that are driven for securing a fingerprint recognition area is not particularly limited. In other words, only one row of sensing blocks SB or four or more rows of sensing blocks SB can be driven as necessary.

The scan lines (SL1 through SLi), the emission lines (EL1 through ELi), and the read-out lines (RL1 through RLj), which are connected to the sensors SN included in each of the sensing blocks SB, may be disposed on the sensing blocks SB.

The scan lines (SL1 through SLi) may include first through i-th row scan lines SL1 through SLi. The first through i-th row scan lines SL1 through SLi may be connected to first through i-th rows of sensing blocks SB. For example, the first scan line SL1 may be connected to the first row of sensing blocks SB, e.g., sensing blocks SB[1,1] through SB[lj] (where j is a positive integer of 2 or greater).

Each of the scan lines (SL1 through SLi) is illustrated as a single line connected to one of the sensing blocks SB. However, each of the scan lines (SL1 through SLi) may be a group of lines individually connected to the sensors SN of one of the sensing blocks SB. Similarly, each of the emission lines (EL1 through ELi) and the read-out lines (RL1 through RLj) is to illustrated as a single line connected to one of the sensing blocks SB, but may be a group of lines individually connected to the sensors SN of one of the sensing blocks SB. The scan lines (SL1 through SLi), the emission lines (EL1 through ELi), and the read-out lines (RL1 through RLj) will be described later with reference to FIG. 3.

The emission lines (EL1 through ELi) may include first through i-th row emission lines EL1 through ELi. The emission lines (EL1 through ELi) may be connected to the sensing blocks SB in the same manner as the scan lines (SL1 through SLi).

As mentioned above, the sensing driving unit 215 may include the scan driving unit 210 and the emission driving unit 220 and may provide signals for sensing to the sensors SN of the sensing panel 205. The scan driving unit 210 may sequentially provide a scan signal to the sensing blocks SB via the scan lines (SL1 through SLi). The emission driving unit 220 may sequentially provide an emission signal to the sensing blocks SB via the emission lines (EL1 through ELi).

The scan driving unit 210 may include scan drivers that are spaced apart from one another and are disposed to correspond to the rows of sensing blocks SB. In other words, scan drivers corresponding to different rows of sensing blocks SB may be isolated from one another, and no carry signal may exist between the scan drivers corresponding to the different rows of sensing blocks SB. For example, in a case where a k-th row scan driver 210$k$ receives a k-th row second initiation signal FLMk and provides a scan signal to a k-th row of sensors SN, no carry signal may be transmitted to a (k+1)-th row scan driver 210$k$+1. In other words, the (k+1)-th row scan driver 210$k$+1 can be driven only if a (k+1)-th row second initiation signal FLMk+1 is received from the timing controller 300.

The emission driving unit 220, which is disposed on one side of the sensing blocks SB, may include emission drivers that are driven in succession. In other words, the emission drivers of the emission driving unit 220 may be connected to one another via a carry signal. For example, in a case where a k-th row emission driver 220$k$ receives a k-th row first initiation signal EM_FLMk and provides an emission signal to the k-th row of sensors SN, the k-th row emission driver 220$k$ may stop operating and may transmit a carry signal to a (k+1)-th row emission driver 220$k$+1 so that the (k+1)-th row emission driver 220$k$+1 can provide the emission signal to a (k+1)-th row of sensors SN.

The read-out lines (RL1 through RLj) may include first through j-th column read-out lines RL1 through RLj. The first through j-th column read-out lines RL1 through RLj may be connected to first through j-th columns of sensing blocks SB. For example, the first read-out line RL1 may be connected to the first column of sensing blocks SB, e.g., the sensing blocks SB[1,1] through SBU[j,1] (where j is a positive integer of 2 or greater).

The area A is an area including a sensing block SB[k,1], which is in an arbitrary k-th row and the first column of the array of sensing blocks SB. In other words, the area A may include the sensing block SB[k,1], a k-th row scan line SLk, and a k-th row emission line ELk. The sensing blocks SB, e.g., the sensing blocks SB[1,1] through SB[i,j], may all have the same structure. The structure of the sensing blocks SB will hereinafter be described taking the sensing block SB[k,1] as an example.

FIG. 3 shows a plurality of sensors SN[1,1] through SN[25,40], which are disposed in the sensing block SB[k,1], and the k-th row scan driver 210k, the k-th row emission driver 220k, the read-out circuit unit 230, and a power supply unit 240, which are connected to the sensors SN[1,1] through SN[25,40].

Multiple sensors SN may be disposed in one sensing block SB. 25 rows and 40 columns of sensors SN, e.g., a total of 1000 sensors SN, may be disposed in the sensing block SB[k,1] of FIG. 3. However, the number and the arrangement of sensors SN in the sensing block SB[k,1] are not particularly limited. For example, the greater the size of the sensing blocks SB, the greater the number of sensors SN arranged in each of the sensing blocks SB.

Referring to FIG. 3, the sensors SN of the sensing block SB[k,1] may be connected to a plurality of k-th row emission lines (EL[1] through EL[25]), a plurality of k-th row scan lines (SL[1] through SL[25]), a first voltage line VCL, a second voltage line VRL, and a plurality of read-out lines (RL[1] through RL[40]).

The k-th row emission lines (EL[1] through EL[25]) may include first through twenty fifth k-th row emission lines EL[1] through EL[25]. The first through twenty fifth k-th row emission lines EL[1] through EL[25] may be connected to first through twenty fifth rows, respectively, of sensors SN of the sensing block SB[k,1]. The k-th row scan lines (SL[1] through SL[25]) may include first through twenty fifth k-th row scan lines SL[1] through SL[25]. The first through twenty fifth k-th row scan lines SL[1] through SL[25] may be connected to the first through twenty fifth rows, respectively, of sensors SN of the sensing block SB[k,1].

The k-th row emission lines (EL[1] through EL[25]) and the k-th row scan lines (SL[1] through SL[25]) may be disposed in parallel to one another and may be connected to a k-th row of sensors SN of the sensing block SB[k,1].

The k-th row emission driver 220k may be disposed to correspond to the sensing block SB[k,1]. The emission drivers of the emission driving unit 220 may be connected to one another. For example, the k-th row emission driver 220k may start operating by receiving a carry signal from a (k−1)-th row emission driver 220k−1 corresponding to a (k−1)-th row sensing block SB previous to the sensing block SB[k,1]. For example, the (k+1)-th row emission driver 220k+1 corresponding to a (k+1)-th row sensing block SB subsequent to the sensing block SB[k,1] may start operating by receiving a carry signal from the k-th row emission driver 220k. In other words, the emission drivers of the emission driving unit 220 may be connected to one another via a carry signal. The k-th row emission driver 220k may start operating by receiving a carry signal from the (k−1)-th row emission driver 220k−1 or by receiving the k-th row first initiation signal EM_FLMk.

The k-th row scan driver 210k may be disposed to correspond to the sensing block SB[k,1]. The scan driving unit 210, which is disposed to correspond to the rows of sensing blocks SB, may be divided into blocks that are isolated from one another. For example, the k-th row scan driver 210k may be disposed to be isolated from the (k−1)-th row sensing block SB previous to the sensing block SB[k,1] and from the (k+1)-th row sensing block SB subsequent to the sensing block SB[k,1]. In other words, the scan drivers of the scan driving unit 210 do not transmit a carry signal to one another and can thus be isolated from one another. The k-th row scan driver 210k may start operating by receiving the k-th row second initiation signal FLMk.

The power supply unit 240 may supply power to the sensors SN of the sensing panel 205 via the first and second voltage lines VCL and VRL. The first voltage line VCL may be a line for supplying a common voltage to the transistors included in each of the sensors SN. The second voltage line VRL may be a line for supplying an initialization voltage to initialize the transistors included in each of the sensors SN.

Figure 4:
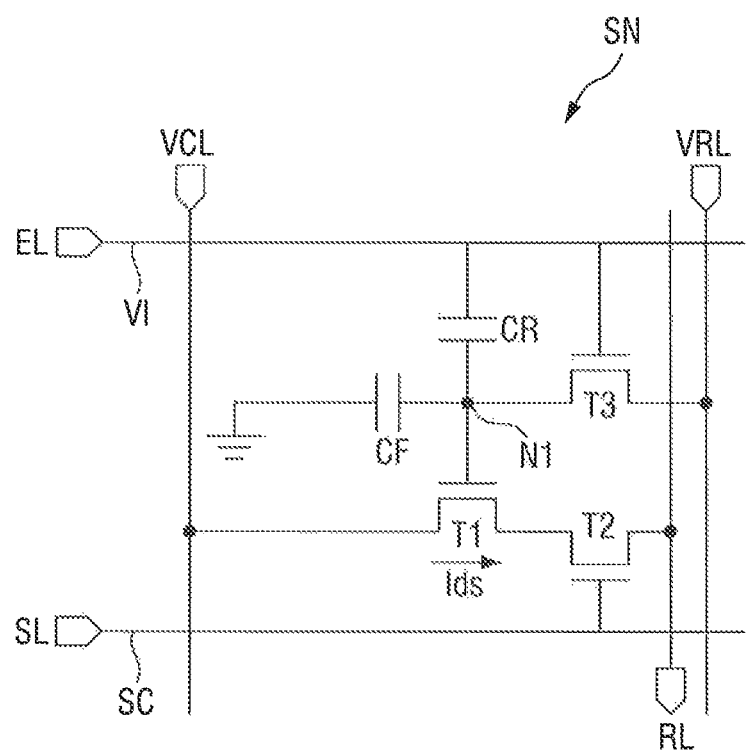
FIG. 4 is a circuit diagram of a capacitive fingerprint sensor according to an exemplary embodiment of the present inventive concept.

FIG. 4 is a circuit diagram of a capacitive fingerprint sensor according to an exemplary embodiment of the present inventive concept. The sensors SN of the sensing panel 205 may have the same structure. Thus, the structure of the sensors SN will hereinafter be described with reference to FIG. 4. The configuration of FIG. 4 may refer to one pixel. For convenience, FIG. 4 illustrates an arbitrary sensor SN connected to an arbitrary scan line SL, an arbitrary emission line EL, an arbitrary read-out line RL, the first voltage line VCL, and the second voltage line VRL.

The scan line SL may provide a scan signal SC to the sensor SN, and the emission line EL may provide an emission signal VI to the sensor SN. The emission signal VI may be an initialization signal. The first voltage line VCL may provide a common voltage, and the second voltage line VRL may provide an initialization voltage.

Referring to FIG. 4, the sensor SN may include a first transistor T1, a second transistor T2, a third transistor T3, a reference capacitor CR, and a sensing capacitor CF.

The first transistor T1 may include a first gate electrode electrically connected to a first node N1, a first electrode electrically connected to the first voltage line VCL, and a second electrode electrically connected to a third electrode of the second transistor 12. The first transistor T1 may control a drain-source current Ids in accordance with the voltage at the first node N1. The drain-source current Ids, which flows through the channel of the first transistor T1, may be proportional to the square of the difference between a gate-source voltage Vgs and a threshold voltage Vth of the first transistor T1, as shown in Equation (1):

$$Ids = k' \times (Vgs - Vth)^2.$$

The drain-source current Ids, which varies in accordance with the voltage at the first node N1 or a voltage caused by the drain-source current Ids, may be a fingerprint sensing signal SS.

The second transistor T2 may include a second gate electrode electrically connected to the scan line SL, the third electrode electrically connected to the second electrode of the first transistor T1, and a fourth electrode electrically connected to the read-out line RL. The second transistor T2 is turned on by the scan signal SC from the scan line SL to connect the first electrode of the first transistor T1 and the read-out line RL. A gate-low voltage may be supplied to the scan line SL to which the second gate electrode of the second transistor T2 is connected. Thus, the second transistor T2 may normally be off. In response to a gate-high voltage being supplied via the scan line SL, the second transistor T2 may be turned on. When the second transistor T2 is turned on, a fingerprint sensing signal SS may be provided to the read-out line RL.

The third transistor T3 may include a third gate electrode electrically connected to the emission line EL, a fifth electrode electrically connected to the first node N1, and a sixth electrode electrically connected to the second voltage line VRL. The third transistor T3 is turned on by the emission signal VI from the emission line EL to connect the first node N1 and the second voltage line VRL. When the third transistor T3 is turned on, the first node N1 may be initialized by the initialization voltage from the second voltage line VRL. The gate-high voltage may be provided to the emission line EL to which the third gate electrode of the third transistor T3 is connected. Thus, the third transistor T3 may normally be on. In response to the gate-low voltage being provided via the emission line EL, the third transistor T3 may be turned off. In other words, when the third transistor T3 is turned off by the gate-low voltage, the first node N and the second voltage line VRL may be disconnected from each other, and the voltage at the first node N1 may be fixed.

The reference capacitor CR may include a seventh electrode electrically connected to the emission line EL and an eighth electrode electrically connected to the first node N1. The capacitance of the reference capacitor CR may be fixed and uniform.

The sensing capacitor CF may be a capacitance generated between the ridges or valleys of a finger of a user and the sensor SN. In other words, when there is no touch input from the user, the sensing capacitor CF does not exist. For example, only when touch input is generated by the user, the sensing capacitor CF is generated. The sensing capacitor CF may include a ninth electrode electrically connected to the first node N1 and a tenth electrode connected to the body of the user. The tenth electrode may be a ground electrode. The capacitance of the sensing capacitor CF may vary depending on the distance between the sensor SN and a fingerprint ridge or valley.

As the capacitance of the sensing capacitor CF varies, the voltage at the first node N1 between the reference capacitor CR and the sensing capacitor CF may vary. For example, a variation in the voltage at the first node N1 may be determined according to the voltage distribution law. In other words, when the sensing capacitor CF does not exist, the voltage at the first node N1 may be the voltage initialized by the second voltage line VRL. Then, when the sensing capacitor CF is generated, the voltage at the first node N1 may change according to the capacitance of the sensing capacitor CF. As mentioned above, the drain-source current Ids of the first transistor T1 may be proportional to the square of the difference between the gate-source voltage and the threshold voltage of the first transistor T1. Thus, when the voltage at the first node N1 changes, the voltage applied to the first gate electrode of the first transistor T1 changes, and the drain-source current Ids may also change. Accordingly, the value of the fingerprint sensing signal SS provided to the read-out line RL may change, and a fingerprint can be imaged based on a variation in the value of the fingerprint sensing signal SS.

Semiconductor layers of the first, second, and third transistors T1, T2, and T3 may be formed of polysilicon, amorphous silicon, or an oxide semiconductor. In a case where the semiconductor layers of the first, second, and third transistors T1, T2, and T3 are formed of polysilicon, the semiconductor layers of the first, second, and third transistors T1, T2, and T3 may be formed by a low-temperature polysilicon (LTPS) process.

FIG. 4 illustrates the first, second, and third transistors T1, T2, and T3 as being N-type metal oxide semiconductor field effect transistors (MOSFETs), but the present inventive concept is not limited thereto. Alternatively, the first, second, and third transistors T1, T2, and T3 may be CMOS transistors or N-channel metal oxide semiconductor (NMOS) transistors. A fingerprint sensor including P-type MOSFETs will be described later with reference to FIG. 12.

Figure 5A:
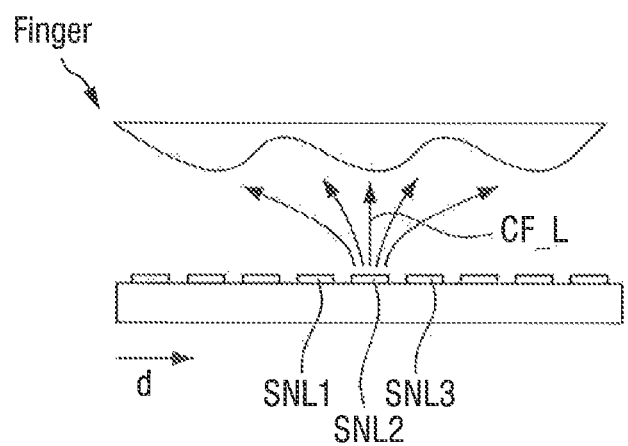
FIGS. 5A and 5B are schematic views illustrating how a line-driving fingerprint recognition method differs from an area-driving fingerprint recognition method.
Figure 5B:
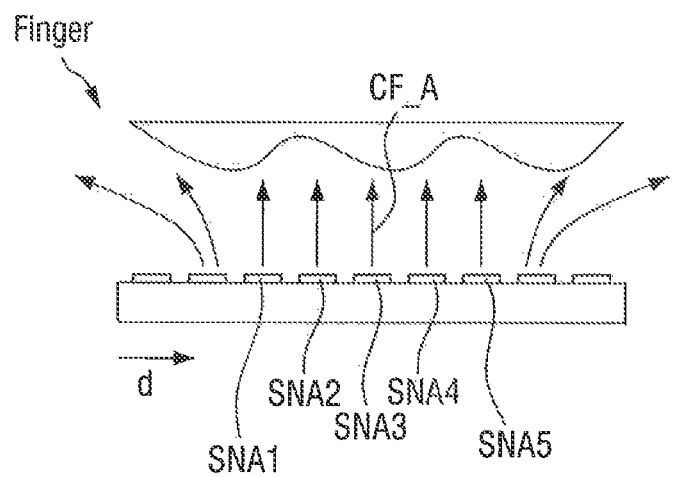

FIGS. 5A and 5B are schematic views illustrating how a line-driving method differs from an area-driving fingerprint recognition method. FIGS. 5A and 5B illustrate sensors (SNL1, SNL2, SNL3, SNA1, SNA2, SNA3, SNA4, and SNA5) for sensing a fingerprint. FIG. 5A illustrates the line-driving fingerprint sensing method, and FIG. 5B illustrates the area-driving fingerprint recognition method. FIGS. 5A and 5B are longitudinal sectional views of a line-driving fingerprint recognition device and an area-driving fingerprint recognition device, respectively. In other words, the sensors of FIG. 5A or 5B may all belong to different rows.

Referring to FIG. 5A, the line driving fingerprint recognition device may include first, second, and third line sensors SNL1, SNL2, and SNL3. A scan signal and then an emission signal may be sequentially provided to the first, second, and third line sensors SNL1, SNL2, and SNL3 along a sensing direction d.

Referring to FIG. 5B, the area-driving fingerprint recognition device may include first, second, third, fourth, and fifth area sensors SNA1, SNA2, SNA3, SNA4, and SNA5. A scan signal may be sequentially provided to the first, second, third, fourth, and fifth area sensors SNA1, SNA2, SNA3, SNA4, and SNA5 along a sensing direction d.

An emission signal may be simultaneously provided to the first, second, third, fourth, and fifth area sensors SNA1, SNA2, SNA3, SNA4, and SNA5. In other words, the emission signal may be simultaneously applied to a sensor to which a scan signal is applied and to sensors adjacent to the sensor to which the scan signal is applied.

For example, three emission signals may be simultaneously provided for a single scan signal. A fingerprint recognition device in which a scan signal is sequentially applied to the second, third, and fourth area sensors SNA2, SNA3, and SNA4 will hereinafter be described.

First, in the case of sensing a fingerprint by providing a scan signal to the second area sensor SNA2, three emission signals may be simultaneously provided to the first, second, and third area sensors SNA1, SNA2, and SNA3. Thereafter, in the case of sensing a fingerprint by providing a scan signal to the third area sensor SNA3, three emission signals may be simultaneously provided to the second, third, and fourth area sensors SNA2, SNA3, and SNA4. Finally, in the case of sensing a fingerprint by providing a scan signal to the fourth area sensor SNA4, three emission signals may be simultaneously provided to the third, fourth, and fifth area sensors SNA3, SNA4, and SNA5.

In the case of sensing a fingerprint using the line-driving fingerprint recognition method, the capacitance of a line sensing capacitor CF_L may not be precisely measured. For example, referring to FIG. 5A, in response to a scan signal and an emission signal provided to the second line sensor SNL2, the second line sensor SNL2 measures the capacitance of the line sensing capacitor CF_L with respect to a corresponding fingerprint ridge. The line sensing capacitor CF_L may be affected by a blur phenomenon between the fingerprint ridge corresponding to the second line sensor SNL2 and a fingerprint valley adjacent to the fingerprint ridge corresponding to the second line sensor SNL2. For example, the distance from the second line sensor SNL2 to the fingerprint valley adjacent to the fingerprint ridge corresponding to the second line sensor SNL2 may be greater than the distance from the second line sensor SNL2 to the fingerprint ridge corresponding to the second line sensor SNL2. In other words, the average distance between the second line sensor SNL2 and the fingerprint ridge corresponding to the second line sensor SNL2 may be measured to be greater than it actually is. As a result, since the capacitance of a capacitor is proportional to the distance between the capacitor and a conductive object, the capacitance of the line sensing capacitor CF_L may be measured by the second line sensor SNL2 to be greater than the actual capacitance of the line sensing capacitor CF_L.

On the other hand, in the case of sensing a fingerprint using the area-driving fingerprint recognition method, a blur phenomenon between fingerprint ridges and valleys can be minimized by driving multiple area sensors, e.g., the first, second, third, fourth, and fifth area sensors SNA1, SNA2, SNA3, SNA4, and SNA5, at the same time. For example, in response to a scan signal provided to the third area sensor SNA3, three emission signals may be simultaneously provided to the second, third, and fourth area sensors SNA2, SNA3, and SNA4. Accordingly, the third area sensor SNA3 can measure the capacitance of an area sensing capacitor CF_A without being affected by any blur phenomenon.

In other words, the capacitance of the area sensing capacitor CF_A can be measured more precisely than the capacitance of the line sensing capacitor CF_L even when the same fingerprint ridge is sensed.

Figure 6:
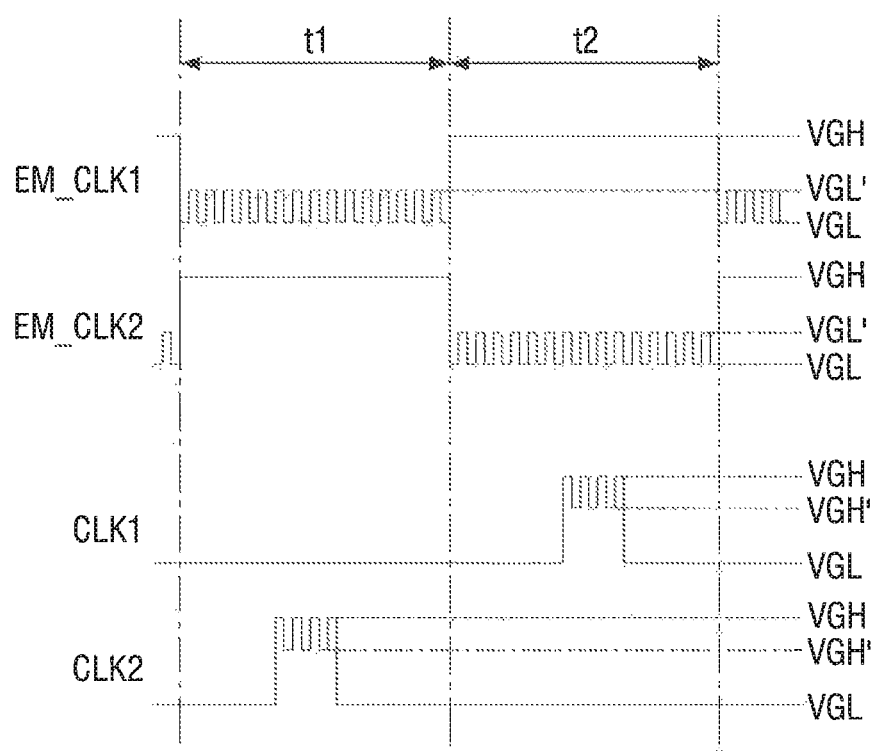
FIG. 6 is a waveform diagram showing emission clock signals and scan clock signals according to an exemplary embodiment of the present inventive concept.

FIG. 6 is a waveform diagram showing emission clock signals and scan clock signals according to an exemplary embodiment of the present inventive concept.

Referring to FIGS. 1 and 6, the timing controller 300 provides the emission control signal ECS and the scan control signal SCS to the emission driving unit 220 and the scan driving unit 210, respectively. Each of the emission control signal ECS and the scan control signal SCS includes various control signals. For example, the emission control signal ECS includes first and second emission clock signals EM_CLK1 and EM_CLK2, and the scan control signal SCS includes first and second scan clock signals CLK1 and CLK2. The first and second emission clock signals EM_CLK1 and EM_CLK2 and the first and second scan clock signals CLK1 and CLK2 may be provided by the timing controller 300 to drive the emission driving unit 220 and the scan driving unit 210. The first and second emission clock signals EM_CLK1 and EM_CLK2 and the first and second scan clock signals CLK1 and CLK2 may be modulated into predetermined frequencies during a predetermined period of time.

The first and second emission clock signals EM_CLK1 and EM_CLK2 may swing between a first gate-low voltage VGL and a first gate-high voltage VGH in first and second periods t1 and t2. In addition, the first and second scan clock signals CLK1 and CLK2 may swing between the first gate-low voltage VGL and the first gate-high voltage VGH in the first and second periods t and t2.

In the first period t1, the first emission clock signal EM_CLK1 may quickly swing between the first gate-low voltage VGL and a second gate-low voltage VGL'. In other words, in the first period t1, the first emission clock signal EM_CLK1 may be modulated into a high frequency. In the first period t1, the second emission clock signal EM_CLK2 may have the first gate-high voltage VGH.

In addition, in the first period t1, the first scan clock signal CLK1 may have the first gate-low voltage VGL. In the first period t1, pulses that quickly swing between the first gate-high voltage VGH and a second gate-high voltage VGH' may be generated in the second scan clock signal CLK2. In other words, in the first period t1, the second scan clock signal CLK2, like the first emission clock signal EM_CLK1, may be modulated into a high frequency. However, the second scan clock signal CLK2 may only have the high frequency for a portion of the first period t1. The pulses of the first emission clock signal EM_CLK1 may overlap with the pulses of the second scan clock signal CLK2 or may be generated earlier than, and disappear later than, the pulses of the second scan clock signal CLK2.

In the second period t2, the first emission clock signal EM_CLK1 may have the first gate-high voltage VGH. In the second period t2, the second emission clock signal EM_CLK2 may quickly swing between the first gate-low voltage VGL and the second gate-low voltage VGL'. In other words, in the second period t2, the second emission clock signal EM_CLK2, like the first emission clock signal EM_CLK1 during the first period t1, may be modulated into a high frequency.

In addition, in the second period t2, pulses that quickly swing between the first gate-high voltage VGH and the second gate-high voltage VGH' may be generated in the first scan clock signal CLK1. In other words, in the second period t2, the first scan clock signal CLK1, like the second emission clock signal EM_CLK2, may be modulated into a high frequency. The second scan clock signal CLK2 may have the first gate-low voltage VGL. The pulses of the second emission clock signal EM_CLK2 may overlap with the pulses of the first scan clock signal CLK1 or may be generated earlier than, and disappear later than, the pulses of the first scan clock signal CLK1. This is so because the first scan clock signal CLK1 may only have the high frequency for a portion of the second period t2.

As mentioned above, the first and second emission clock signals EM_CLK1 and EM_CLK2 and the first and second scan clock signals CLK1 and CLK2 may be signals modulated into predetermined frequencies, e.g., high frequencies. The first and second emission clock signals EM_CLK1 and EM_CLK2 and the first and second scan clock signals CLK1 and CLK2 may have two voltages during a period when they are modulated into high frequencies. In other words, the first and second emission clock signals EM_CLK1 and EM_CLK2 and the first and second scan clock signals CLK1 and CLK2 may be "2-frequency, 3-level" signals. For example, the first emission clock signal EM_CLK1 may have the first gate-low voltage VGL and the second gate-low voltage VGL' in the first period t1 and may have the first gate-high voltage VGH, which is different from the first gate-low voltage VGL and the second gate-low voltage VGL', in the second period t2. By applying the first and second emission clock signals EM_CLK1 and EM_CLK2 and the first and second scan clock signals CLK1 and CLK2, which are modulated into high frequencies, to the scan driving unit 210 and the emission driving unit 220, noise that is generated when driving the scan driving unit 210 and the emission driving unit 220 can be reduced as compared to when unmodulated clock signals are applied to the scan driving unit 210 and the emission driving unit 220.

The waveforms of the first and second emission clock signals EM_CLK1 and EM_CLK2 and the first and second scan clock signals CLK1 and CLK2 during the first and second periods t1 and t2 may be repeated over periods subsequent to the second period t2. Therefore, detailed descriptions of the waveforms of the first and second emission clock signals EM_CLK1 and EM_CLK2 and the first and second scan clock signals CLK1 and CLK2 in the periods subsequent to the second period t2 will be omitted.

Figure 7:
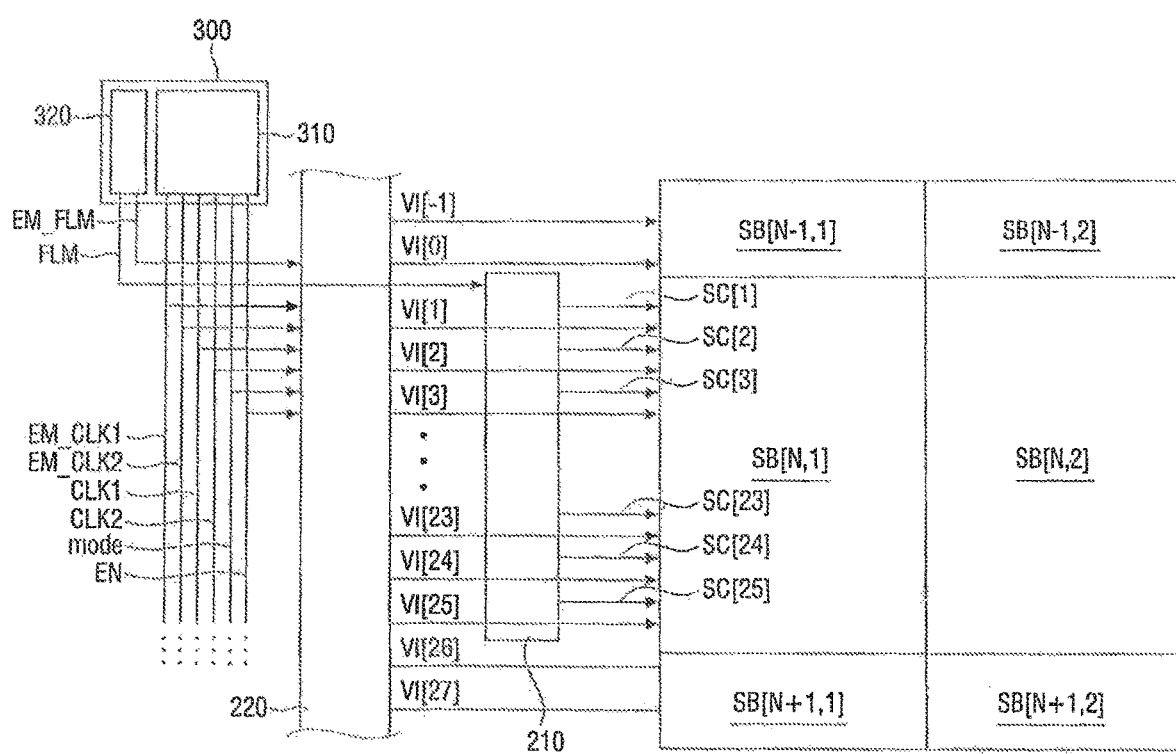
FIG. 7 is a block diagram illustrating signal flows in the fingerprint recognition device according to an exemplary embodiment of the present inventive concept.

FIG. 7 is a block diagram illustrating signal flows in the fingerprint recognition device according to an exemplary embodiment of the present inventive concept. Signals generated by the timing controller 300 and provided to the emission driving unit 220 and the scan driving unit 210 to drive the fingerprint recognition device 200 will hereinafter be described with reference to FIG. 7.

Referring to FIGS. 1 and 7, the timing controller 300 may generate the emission control signal ECS, the scan control signal SCS, a mode signal "mode", and an enable signal EN and may provide the emission control signal ECS, the scan control signal SCS, the mode signal "mode", and the enable signal EN to the emission driving unit 220 and the scan driving unit 210.

The mode signal "mode" may be a signal for distinguishing a touch mode from a fingerprint recognition mode. When the mode signal "mode" is on, the fingerprint recognition device 200 may operate in the touch mode. The touch mode is a mode for sensing touch input generated by the user and calculating the coordinates of the touch input. When the mode signal "mode" is off, the fingerprint recognition device 200 may operate in the fingerprint recognition mode. The fingerprint recognition mode may be a mode for sensing a fingerprint from the user and acquiring an image of the fingerprint. The mode signal "mode" may be controlled by the timing controller 300.

The enable signal EN may be a signal for driving the emission driving unit 220 and the scan driving unit 210. The emission driving unit 220 and the scan driving unit 210 may be driven only when the enable signal EN is on. In other words, when the enable signal EN is turned off from an on state, the emission driving unit 220 and the scan driving unit 210 stop operating.

The emission control signal ECS may include the first initiation signal EM_FLM, the first emission clock signal EM_CLK1, and the second emission clock signal EM_CLK2.

In response to the first initiation signal EM_FLM, which is a signal for initiating the operation of the emission driving unit 220, applied to the emission driving unit 220, the emission driving unit 220 may generate an emission signal VI, which is for driving the sensors SN of the sensing panel 205, and may provide the emission signal VI to the sensors SN. First initiation signal lines for providing the first initiation signal EM_FLM may be provided to correspond to the rows of sensor blocks SB.

The first and second emission clock signals EM_CLK1 and EM_CLK2, which are signals for driving the emission driving unit 220, may be signals modulated into predetermined frequencies, as mentioned above with reference to FIG. 6.

The scan control signal SCS may include the second initiation signal FLM, the first scan clock signal CLK1, and the second scan clock signal CLK2.

In response to the second initiation signal FLM, which is a signal for initiating the operation of the scan driving unit 210, applied to the scan driving unit 210, the scan driving unit 210 may generate a scan signal SC for sensing measurement data from the sensors SN and may provide the scan signal SC to the sensors SN. Second initiation signal lines for providing the second initiation signal FLM may be provided to correspond to the rows of sensor blocks SB.

The first and second scan clock signals CLK1 and CLK2, which are signals for driving the scan driving unit 210, may be signals modulated into predetermined frequencies, as mentioned above with reference to FIG. 6. The first and second scan clock signals CLK1 and CLK2 may be applied to the emission driving unit 220 and may then be transmitted from the emission driving unit 220 to the scan driving unit 210, as illustrated in FIG. 7, but the present inventive concept is not limited thereto. Alternatively, the first and second scan clock signals CLK1 and CLK2 may be directly applied to the scan driving unit 210 from the timing controller 300.

The first emission clock signal EM_CLK1, the second emission clock signal EM_CLK2, the first scan clock signal CLK1, the second scan clock signal CLK2, the mode signal "mode", and the enable signal EN may be generated by a signal generator 310 of the timing controller 300 and may be provided to the emission driving unit 220 and the scan driving unit 210.

The first and second initiation signals EM_FLM and FLM may be generated by an initiation signal generator 320 of the timing controller 300 and may be applied to the emission driving unit 220 and the scan driving unit 210, but the present inventive concept is not limited thereto. Alternatively, the timing controller 300 may output the addresses of the first and second initiation signals EM_FLM and FLM, and the initiation signal generator 320, which is disposed on the outside of the timing controller 300, may generate the first and second initiation signals EM_FLM and FLM. For example, in a case where the fingerprint recognition device 200 includes 32 rows of sensing blocks SB, the timing controller 300 may generate 5-bit signals and may transmit the 5-bit signals to the initiation signal generator 320, which is disposed on the outside of the timing controller 300. The 5-bit signals may be used to generate the addresses of each of the 32 rows of sensing blocks SB. In other words, the initiation signal generator 320 may generate the first and second initiation signals EM_FLM and FLM based on 5-bit addresses provided by the timing controller 300 and may then provide the first and second initiation signals EM_FLM and FLM to the emission driving unit 220 and the scan driving unit 210.

The emission driving unit 220 may be configured to be driven in succession. As mentioned above, the emission driving unit 220 may generate a carry signal and may thus be able to be driven in succession. The emission driving unit 220 may terminate its operation by turning off the enable signal EN. In short, the operation of the emission driving unit 220 may be initiated by the first initiation signal EM_FLM and may be terminated by the enable signal EM.

The scan driving unit 210 may be divided into blocks to correspond to the rows of sensing blocks SB. For example, an N-th row scan driver corresponding to an N-th row sensing block SB[N,1] provides a last scan signal SC[25], but may not generate any carry signal. In other words, even if the N-th row scan driver is driven, an (N+1)-th row scan driver may not be driven. The operation of each of the scan drivers of the scan driving unit 210 may be initiated only by the second initiation signal FLM.

To realize the area-driving fingerprint recognition method described above with reference to FIGS. 5A and 5B, the emission driving unit 220 may be driven in a wider range than the scan driving unit 210. For example, in a case where 25 scan signals, e.g., N-th row first through twenty fifth scan signals SC[1] through SC[25], are applied to the sensing block SB[N,1], an (N−1)-th row emission driver may be driven in response to the N-th row first scan signal SC[1] and may provide emission signals VI[−1] and VI[0]. In addition, an N-th row emission driver may be driven and may provide emission signals VI[1], VI[2], and VI[3]. In other words, for the N-th row first scan signal SC[1], five emission signals, e.g., emission signals VI[−1], VI[0], VI[1], VI[2] and VI[3], may be generated, thereby realizing the area-driving fingerprint recognition method. Similarly, for the N-th row second scan signal SC[2], the emission driving unit 220 may provide five emission signals VI[0], VI[1], VI[2], VI[3], and VI[4]. Finally, in response to the N-th row twenty fifth scan signal SC[25], the emission driving unit 220 may provide five emission signals, e.g., an N-th row twenty third emission signal VI[23], an N-th row twenty fourth emission signal VI[24], an N-th row twenty fifth emission signal VI[25], an (N+1)-th row first emission signal VI[26], and an (N+1)-th row second emission signal VI[27].

Accordingly, in the case of applying five emission signals VI for each scan signal SC and providing the scan signal SC to a total of 25 scan lines, the emission signals VI may be provided to a total of 29 emission lines. By driving the emission driving unit 220 in a wider range than the scan driving unit 210, the area-driving fingerprint recognition method can be realized, and a blur phenomenon that may occur at both ends of the scan driving unit 210 can be prevented.

Figure 8:
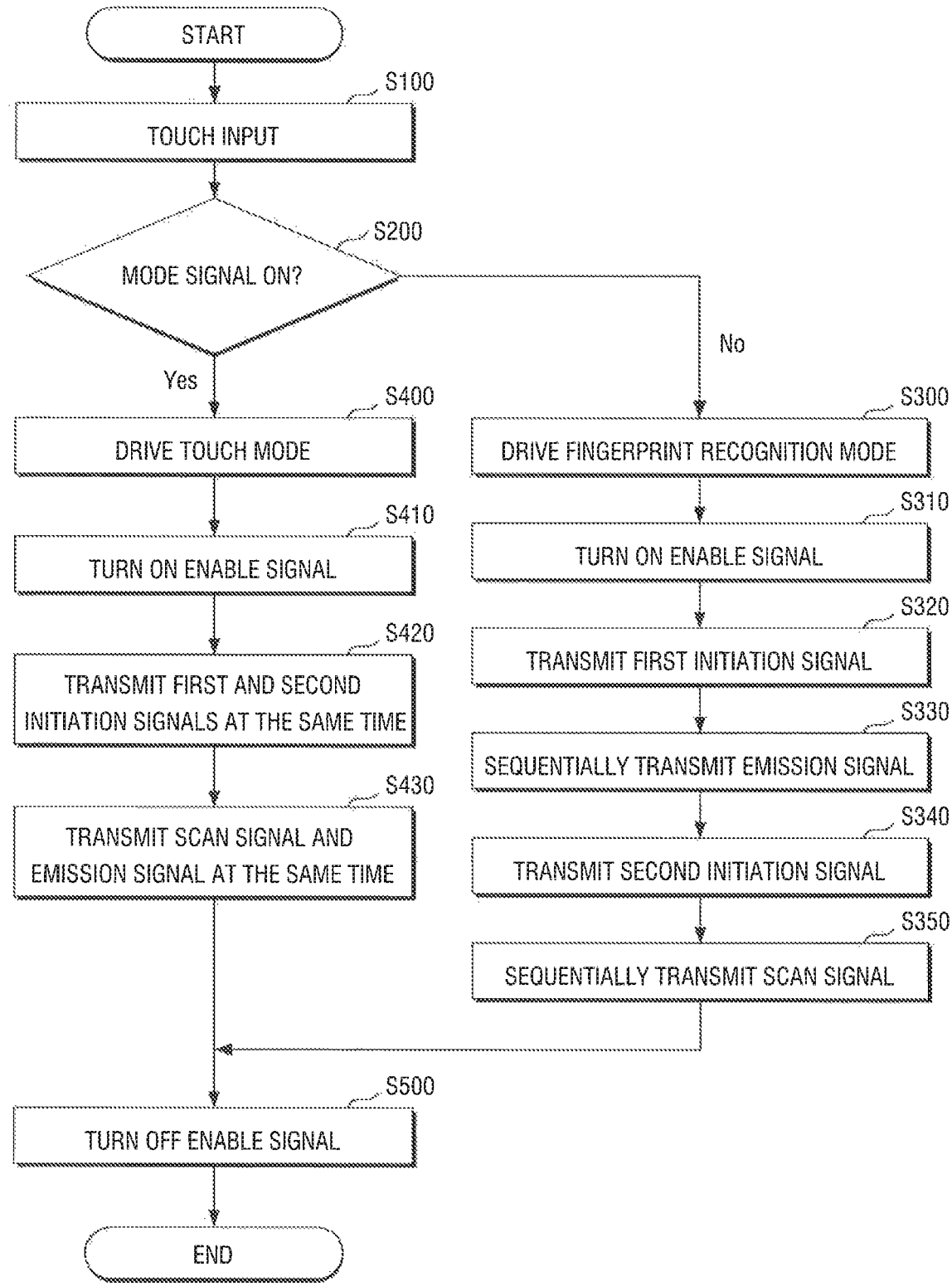
FIG. 8 is a flowchart illustrating the operation of the fingerprint recognition device according to an exemplary embodiment of the present inventive concept.

FIG. 8 is a flowchart illustrating the operation of the fingerprint recognition device according to an exemplary embodiment of the present inventive concept. A fingerprint/touch sensing method of the display device 10 including the fingerprint recognition device 200 will hereinafter be described with reference to FIGS. 1, 7, and 8. When an arbitrary signal is on, it means that the arbitrary signal has a gate-high voltage. When the arbitrary signal is off, it means that the arbitrary signal has a gate-low voltage. When the arbitrary signal is turned on, it means that the arbitrary signal is turned on from an off state. When the arbitrary signal is turned off, it means that the arbitrary signal is turned off from an on state.

Referring to FIGS. 1, 7, and 8, the main processor of the display device 10 determines whether touch input from the user has been generated on the display panel 100 (S100). In response to a determination being made that the touch input has been generated by the user, the timing controller 300 determines whether the mode signal "mode" is on (S200).

The fingerprint recognition device 200 may be driven in the touch mode or the fingerprint recognition mode depending on whether the mode signal "mode" is on or off. When the mode signal "mode" is off, the fingerprint recognition device 200 is driven in the fingerprint recognition mode (S300). When the mode signal "mode" is on, the fingerprint recognition device 200 is driven in the touch mode (S400). In other words, the fingerprint recognition mode and the touch mode can be realized at the same time by a single fingerprint recognition device 200.

The operation of the fingerprint recognition device 200 in the fingerprint recognition mode will hereinafter be described. The fingerprint recognition mode may encompass a series of driving processes that will hereinafter be described. If the mode signal "mode" is off when touch input is generated by the user, the timing controller 300 may turn on the enable signal EN (S310). The enable signal EN may be a signal for driving the emission driving unit 220 and the scan driving unit 210. In other words, in response to the enable signal EN being turned on, the emission driving unit 220 and the scan driving unit 210 may start operating.

Thereafter, the timing controller 300 may provide a first initiation signal EM_FLM to the emission driving unit 220 (S320). The first initiation signal EM_FLM may be provided to the emission driving unit 220, which corresponds to each of the rows of sensing blocks SB, via the first initialization signal lines, which are provided for the rows of sensing blocks SB. The first initiation signal EM_FLM may initiate the operation of the emission driving unit 220. For example, the first initiation signal EM_FLM may be provided to an emission driver corresponding to a row including a sensing block SB corresponding to the location of the touch input from the user. To realize the area-driving fingerprint recognition method described above with reference to FIGS. 5A and 5B, the first initiation signal EM_FLM may be provided more than once. For example, the first initiation signal EM_FLM may be sequentially provided five times.

The emission driving unit 220 may provide an emission signal VI to sensors SN (S330). The emission signal VI may be provided in the same manner as the first initiation signal EM_FLM. In other words, the emission signal VI may be sequentially transmitted. For example, if the first initiation signal EM_FLM is sequentially provided five times, the emission signal VI may also be sequentially provided five times. The emission driving unit 220 may sequentially provide the emission signal VI to sensors SN included in the sensing block SB corresponding to the location of the touch input from the user by generating a carry signal. The emission driving unit 220 may transmit the carry signal to an emission driver corresponding to a row subsequent to the row including the sensing block SB corresponding to the location of the touch input from the user. Then, the emission driver receiving the carry signal may sequentially provide the emission signal VI to sensors SN.

After the generation of the first initiation signal EM_FLM and the emission signal VI, the timing controller 300 may provide a second initiation signal FLM to the scan driving unit 210 (S340). The second initiation signal FLM may be provided to the scan driving unit 210, which corresponds to each of the rows of sensing blocks SB, via the second initiation signal lines, which are provided for the rows of the sensing blocks SB. For example, the second initiation signal FLM may be provided to a scan driver corresponding to the row including the sensing block SB corresponding to the location of the touch input from the user.

The scan driving unit 210 may sequentially provide a scan signal SC to sensors SN (S350). The scan signal SC may be provided in the same manner as the second initiation signal FLM. The scan driving unit 210 may start operating in response to the second initiation signal FLM. After the generation of the scan signal SC, the scan driving unit 210 may sequentially provide the scan signal SC to the sensors SN included in the sensing block SB corresponding to the location of the touch input from the user by generating a carry signal. The carry signal may not be transmitted between scan drivers corresponding to different rows of sensing blocks SB. Accordingly, the scan driving unit 210 may stop operating once its operation for a single sensing block SB is complete. The emission signal VI may be provided to sensors SN ahead of the scan signal SC. Sensors SN may receive the scan signal SC and may thus sense fingerprint information.

After S350, the timing controller 300 may turn off the enable signal EN (S500). In response to the enable signal EN being turned off, the operations of the emission driving unit 220 and the scan driving unit 210 may all be terminated. As mentioned above, the scan drivers of the scan driving unit 210 do not generate a carry signal for their respective subsequent scan drivers. On the other hand, since the emission drivers of the emission driving unit 220 generate a carry signal for their subsequent emission drivers, the operation of the emission driving unit 220 may be terminated by turning off the enable signal EN. The enable signal EN may be turned off when all emission signals for fingerprint recognition are provided.

The operation of the fingerprint recognition device 200 in the touch recognition mode will hereinafter be described. The touch recognition mode may encompass a series of driving processes that will hereinafter be described. If the mode signal "mode" is on when the touch input is generated by the user, the fingerprint recognition device 200 may be driven in the touch mode (S400). In the touch mode, the timing controller 300 may turn on the enable signal EN (S410).

Thereafter, the timing controller 300 may transmit the first and second initiation signals EM_FLM and FLM to the emission driving unit 220 and the scan driving unit 210 at the same time (S420). In the touch mode, the first and second initiation signals EM_FLM and FLM may be transmitted to a first row emission driver and a first row scan driver. Once the driving of the first row emission driver and the first row scan driver in the touch mode is complete, the first and second initiation signals EM_FLM and FLM may be sequentially transmitted to other emission drivers and other scan drivers so that all of the emission drivers and all of the scan drivers can receive the first and second initiation signals EM_FLM and FLM. For example, the first and second initiation signals EM_FLM and FLM may be transmitted to a second row emission driver and a second row scan driver, and so forth.

In response to the first and second initiation signals EM_FLM and FLM, the emission driving unit 220 and the scan driving unit 210 may transmit the emission signal VI and the scan signal SC at the same time (S430). In the fingerprint recognition mode, the emission signal VI and the scan signal SC are sequentially provided to the sensors SN included in each of the sensing blocks SB, but here in the touch mode, the emission signal VI and the scan signal SC may be provided to all the sensors SN in each of the sensing blocks SB at the same time. In other words, the amount of time required for sensing can be reduced by simultaneously driving all of the sensors SN in each of the sensing blocks SB.

After S430, the timing controller 300 may turn off the enable signal EN (S500). In response to the enable signal EN being turned off, the operations of the emission driving unit 220 and the scan driving unit 210 may all be terminated.

Figure 9:
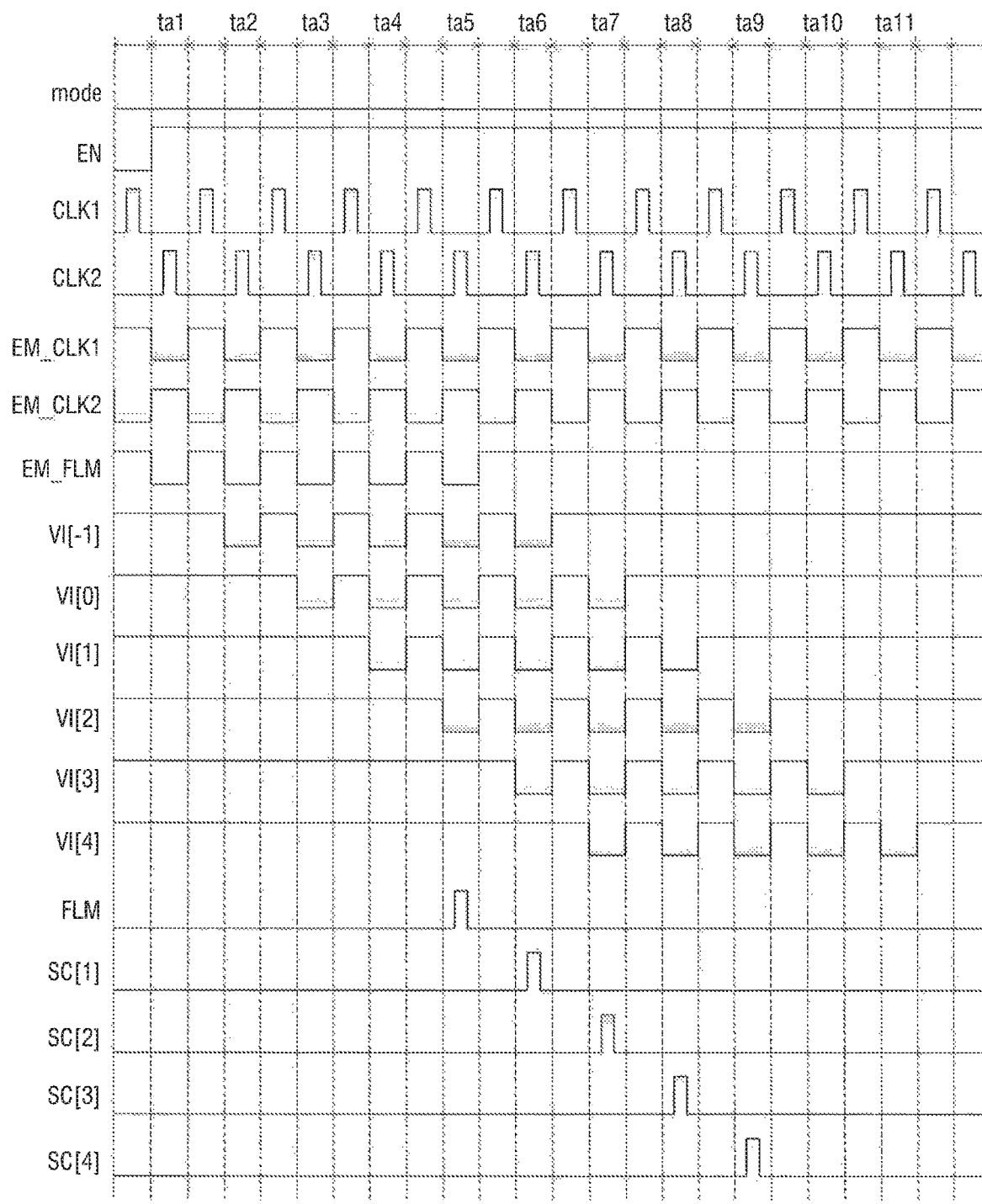
FIG. 9 is a timing diagram showing signals output by a timing controller and a sensing driver of the fingerprint recognition device according to an exemplary embodiment of the present inventive concept in a fingerprint recognition mode.
Figure 10:
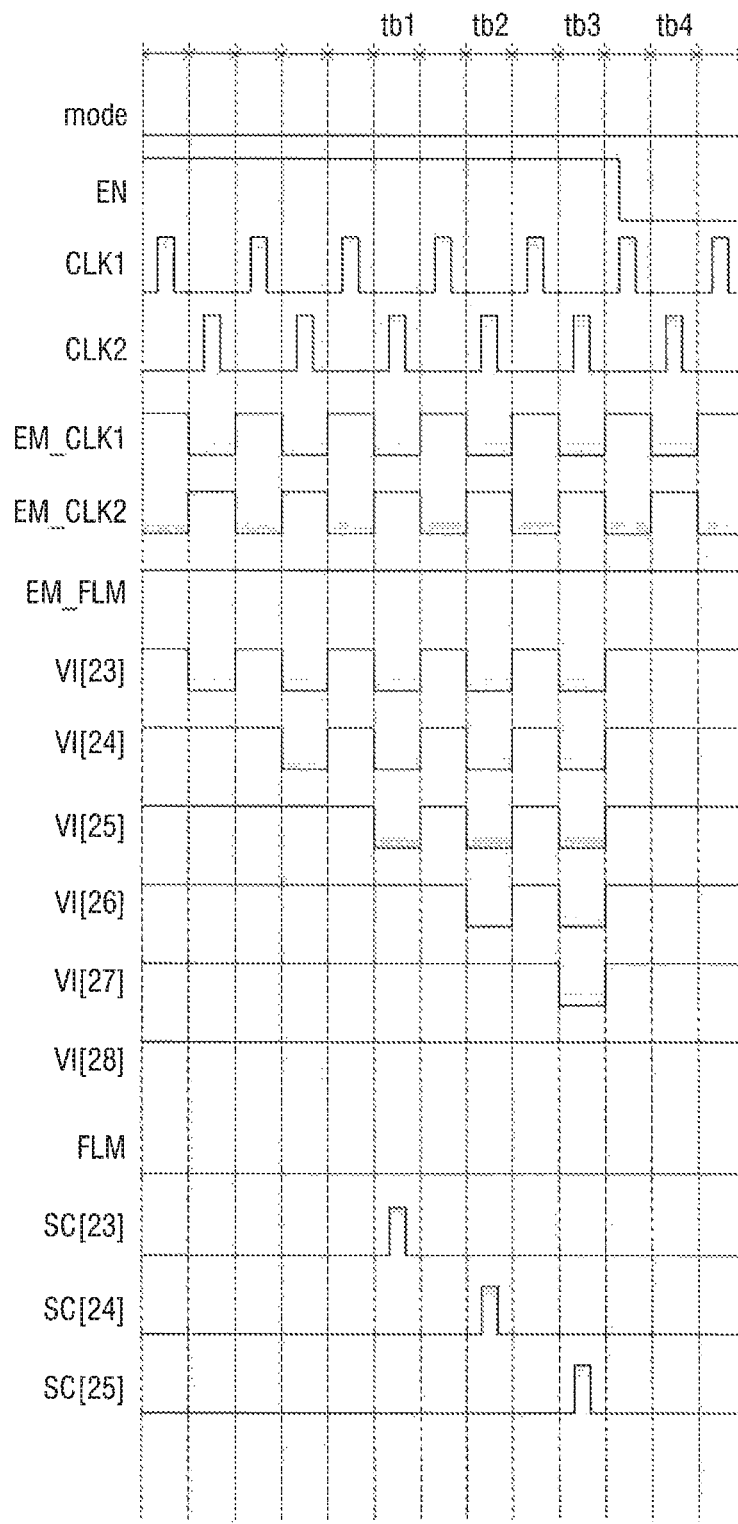
FIG. 10 is a timing diagram showing signals output by the timing controller and the sensing driver of the fingerprint recognition device according to an exemplary embodiment of the present inventive concept when the fingerprint recognition mode is complete.

FIG. 9 is a timing diagram showing signals output by the timing controller and the sensing driver of the fingerprint recognition device according to an exemplary embodiment of the present inventive concept in the fingerprint recognition mode. FIG. 10 is a timing diagram showing signals output by the timing controller and the sensing driver of the fingerprint recognition device according to an exemplary embodiment of the present inventive concept when the fingerprint recognition mode is complete.

For example, FIGS. 9 and 10 are timing diagrams for a case where the fingerprint recognition device is driven in the fingerprint recognition mode with the mode signal "mode" off. Referring to FIGS. 9 and 10, a minus first row refers to the second previous row from a first row, and a zeroth row refers to the first previous row from the first row. In other words, the row next to the minus first row is the zeroth row, and the row next to the zeroth row is the first row.

An operation performed on a single sensing block SB in the fingerprint recognition mode will hereinafter be described with reference to FIGS. 1 through 8. It is assumed that each sensing block SB includes a total of 25 rows of sensors SN, and that the fingerprint recognition device 200 includes 25 emission lines and 25 scan lines corresponding to the 25 rows of sensors SN.

Each signal may swing between a gate-high voltage and a gate-low voltage. When each signal is on, it may mean that each signal has the gate-high voltage. When each signal is off, it may mean that each signal has the gate-low voltage. When each signal is turned on, it may mean that each signal is converted from the gate-low voltage to the gate-high voltage. When each signal is turned off, it ma mean that each signal is converted from the gate-high voltage to the gate-low voltage.

As mentioned above with reference to FIG. 6, the first and second emission clock signals EM_CLK1 and EM_CLK2 and the first and second scan clock signals CLK1 and CLK2 may be signals modulated into high frequencies. Since the first and second emission clock signals EM_CLK1 and EM_CLK2 and the first and second scan clock signals CLK1 and CLK2 are for driving the emission driving unit 220 and the scan driving unit 210, an emission signal VI and a scan signal SC may also be signals modulated into high frequencies. Gray shaded areas in FIGS. 9 and 10 indicate sections in which signals are modulated into high frequencies. An example of a gray shaded area corresponds to the low point of the first emission clock signal EM_CLK1 in period ta1. Another example of the gray shaded area corresponds to the high point of the second scan clock signal CLK2 in the period ta1.

In a first initiation period ta1 when the fingerprint recognition mode is initiated, the timing controller 300 may turn on the enable signal EN. In other words, the enable signal EN goes from high to low. In response to the enable signal EN being turned on, the emission driving unit 220 and the scan driving unit 210 may start operating. As the enable signal EN is turned on, the timing controller 300 may provide a first initiation signal EM_FLM to the emission driving unit 220. The first initiation signal EM_FLM may be sequentially provided more than once to realize the area-driving fingerprint recognition method. FIG. 9 shows an example in which the first initiation signal EM_FLM is sequentially provided five times over a period from the first initiation period ta1 to a fifth initiation period ta5.

In a second initiation period ta2, the timing controller 300 may provide the first initiation signal EM_FLM to the emission driving unit 220. In response to the first initiation signal EM_FLM being provided in the first initiation period ta1, the emission driving unit 220 may provide an emission signal VI[−1] to the sensors SN of the sensing panel 205. For example, the emission driving unit 220 may provide the emission signal VI[−1] to a minus first row of sensors SN to perform the area-driving fingerprint recognition method on a first row of sensors SN. More specifically, a minus first row emission driver may generate the emission signal VI[−1] and may transmit a carry signal to a zeroth row emission driver.

In a third initiation period ta3, the timing controller 300 may provide the first initiation signal EM_FLM to the emission driving unit 220. The emission driving unit 220 may transmit the emission signal VI[−1] and an emission signal VI[0] to the minus first row of sensors SN and a zeroth row of sensors SN, respectively. This can be seen, for example, by the emission signal VI[−1] and the emission signal VI[0] going low in the third initiation period ta3.

In a fourth initiation period ta4, the timing controller 300 may provide the first initiation signal EM_FLM to the emission driving unit 220, and the emission driving unit 220 may provide the emission signal VI[−1], the emission signal VI[0], and an emission signal VI[1] to the minus first row of sensors SN, the zeroth row of sensors SN, and a first row of sensors SN, respectively. This can be seen, for example, by the emission signal VI[−1], the emission signal VI[0] and the emission signal VI[1] going low in the fourth initiation period ta4.

In the fifth initiation period ta5, the timing controller 300 may provide the first initiation signal EM_FLM to the emission driving unit 220, and the emission driving unit 220 may provide the emission signal VI[−1], the emission signal VI[0], the emission signal VI[1], and an emission signal VI[2] to the minus first row of sensors SN, the zeroth row of sensors SN, the first row of sensors SN, and a second row of sensors SN, respectively. In addition, the timing controller 300 may provide a second initiation signal FLM to the scan driving unit 210. This occurs when, for example, the second initiation signal FLM goes high in the fifth initiation period ta5.

In a sixth initiation period ta6, the emission driving unit 220 may provide the emission signal VI[−1], the emission signal VI[1], the emission signal VI[1], the emission signal VI[2], and an emission signal VI[3] to the minus first row of sensors SN, the zeroth row of sensors SN, the first row of sensors SN, the second row of sensors SN, and a third row of sensors SN, respectively, and the scan driving unit 210 may provide a scan signal SC[1] to the first row of sensors SN. This occurs when, for example, the scan signal SC[1] goes high in the sixth initiation period ta6. In other words, the fingerprint recognition device 200 may perform fingerprint recognition on the first row of sensors SN in the area-driving fingerprint recognition method.

In a seventh initiation period ta7, the emission driving unit 220 may provide the emission signal VI[0], the emission signal VI[1], the emission signal VI[2], the emission signal VI[3], and an emission signal VI[4] to the zeroth row of sensors SN, the first row of sensors SN, the second row of sensors SN, the third row of sensors SN, and a fourth row of sensors SN, respectively, and the scan driving unit 210 may provide the scan signal SC[2] to the second row of sensors SN. This occurs when, for example, the scan signal SC[2] goes high in the seventh initiation period ta7.

In an eighth initiation period ta8, the emission driving unit 220 may provide the emission signal VI[1], the emission signal VI[2], the emission signal VI[3], the emission signal VI[4], and an emission signal VI[5] to the first row of sensors SN, the second row of sensors SN, the third row of sensors SN, the fourth row of sensors SN, and a fifth row of sensors SN, respectively. The emission signal VI[5] is not illustrated in FIG. 9, but may be provided in the same manner as the other emission signals.

Similarly, in ninth, tenth and eleventh initiation periods ta9, ta10 and ta11, five emission signals VI may be provided for a single scan signal SC so that the area-driving fingerprint recognition method can be performed. In addition, even after the eleventh initiation period ta11, the fingerprint recognition mode can be continued in the same manner as described above.

FIG. 10 is a timing diagram illustrating an operation performed on rows of sensors SN at or near the end of a sensing block SB.

Referring to FIG. 10, in a first termination period tb1, the emission driving unit 220 may provide emission signals to twenty first through twenty fifth rows of sensors SN, and the scan driving unit 210 may provide a scan signal SC[23] to the twenty third row of sensors SN.

In a second termination period tb2, the emission driving unit 220 may provide an emission signal VI[26] to a twenty sixth row of sensors SN to perform the area-driving fingerprint recognition method, and the scan driving unit 210 may provide a scan signal SC[24] to the twenty fourth row of sensors SN.

In a third termination period tb3, the emission driving unit 220 may provide the emission signal VI[26] and an emission signal VI[27] to the twenty sixth row of sensors SN and a twenty seventh row of sensors SN, respectively, to perform the area-driving fingerprint recognition method, and the scan driving unit 210 may provide a scan signal SC[25] to the twenty fifth row of sensors SN. In other words, the emission driving unit 220 may provide emission signals to the twenty third through twenty seventh rows of sensors SN, and the scan driving unit 210 may provide the scan signal SC[25] to the twenty fifth row of sensors SN. Thereafter, the timing controller 300 may turn off the enable signal EN to terminate the fingerprint recognition mode.

In a fourth termination period tb4, since the enable signal EN is off (e.g., low), the operations of the emission driving unit 220 and the scan driving unit 210 may be terminated.

Figure 11:
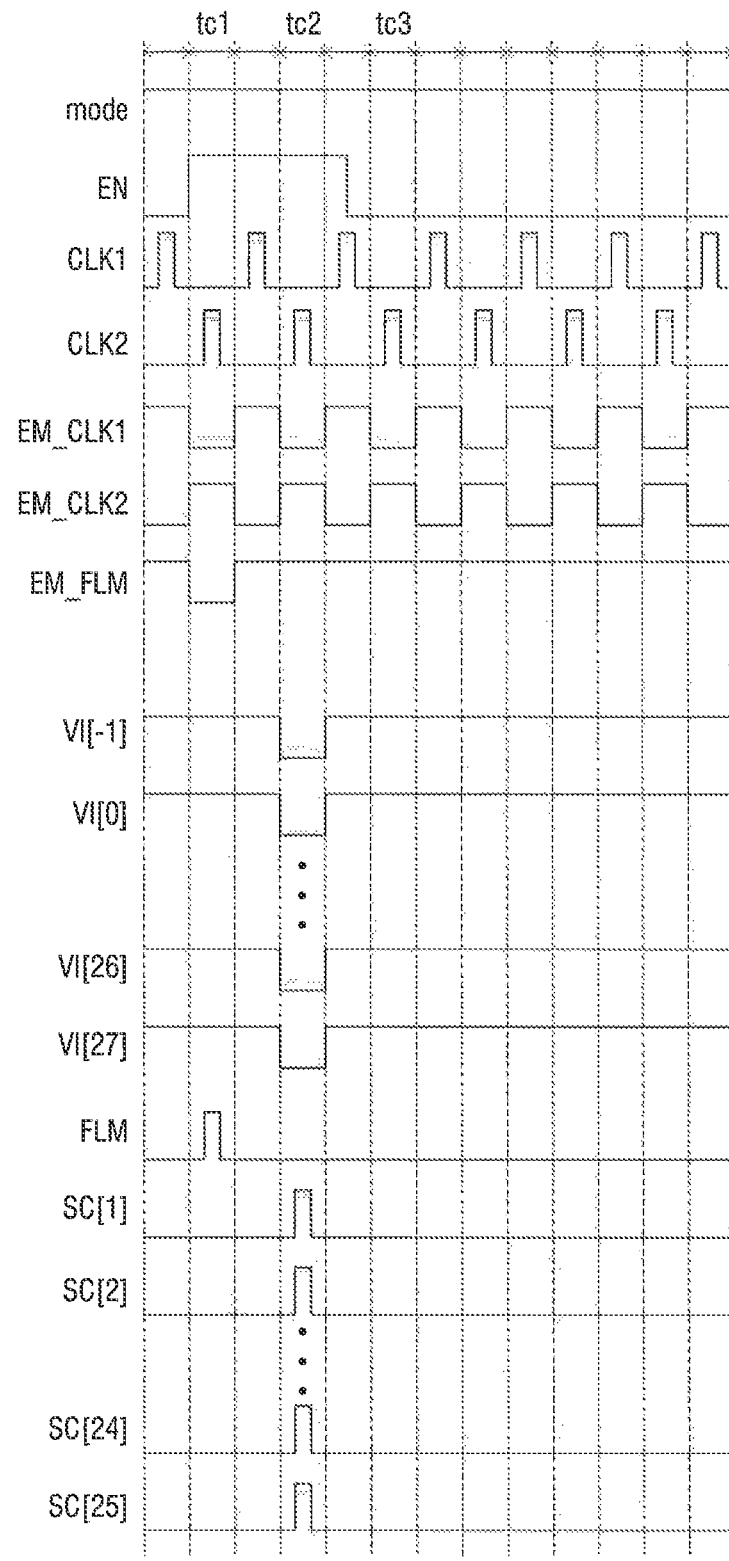
FIG. 11 is a timing diagram showing signals output by the timing controller and the sensing driver of the fingerprint recognition device according to an exemplary embodiment of the present inventive concept when a touch mode is driven and when the touch mode is complete.

FIG. 11 is a timing diagram showing signals output by the timing controller and the sensing driver of the fingerprint recognition device according to an exemplary embodiment of the present inventive concept when the touch mode is driven and when the touch mode is complete.

In a first touch period tc1 when the touch mode is initiated, the timing controller 300 may turn on the enable signal EN. As the enable signal EN is turned on, the timing controller 300 may provide may provide the first initiation signal EM_FLM and the second initiation signal FLM to the emission driving unit 220 and the scan driving unit 210.

In a second touch period tc2, the emission driving unit 220 and the scan driving unit 210 may provide the emission signals VI[−1] through VI[27] and the scan signals SC[1] through SC[25] to all the sensors SN at the same time. Thereafter, the timing controller 300 may turn off the enable signal EN to terminate the touch mode.

In a third touch period tc3, since the enable signal EN is off, the operations of the emission driving unit 220 and the scan driving unit 210 may be terminated.

In the touch mode, all the sensors SN may be driven to sense touch input. Alternatively, only some of the sensors SN may be driven. In other words, in the touch mode, touch input can be sensed by applying an emission signal VI and a scan signal SC to only some of the sensors SN. For example, touch input can be sensed by driving only the odd-numbered rows of sensors SN or the first through fifteenth rows of sensors SN. In this example, the power consumption of the fingerprint recognition device 200 can be reduced as compared to the case of sensing touch input by driving all the sensors SN.

Figure 12:
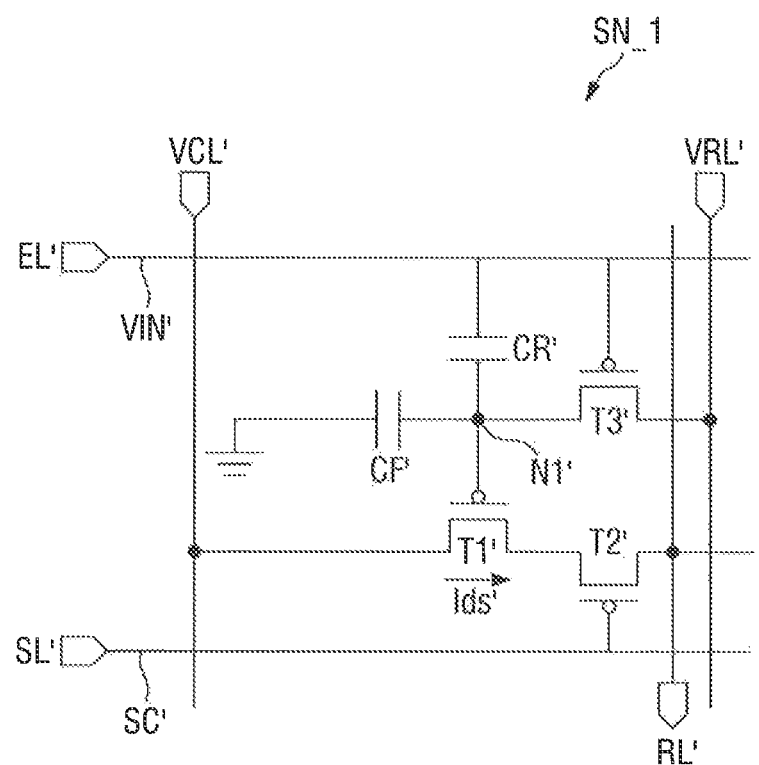
FIG. 12 is a circuit diagram of a capacitive fingerprint sensor according to another exemplary embodiment of the present inventive concept.

FIG. 12 is a circuit diagram of a capacitive fingerprint sensor according to another exemplary embodiment of the present inventive concept. The exemplary embodiment of FIG. 12 differs from the exemplary embodiment of FIG. 4 in that a fingerprint sensor includes P-type MOSFETs. The exemplary embodiment of FIG. 12 will hereinafter be described, focusing mainly on the difference with the exemplary embodiment of FIG. 4.

Referring to FIG. 12, a sensor SN_I may include first, second, and third transistors T1', T2', and T3'. The first, second, and third transistors T1', T2', and T13' may be P-type MOSFETs. Thus, in response to a gate-high voltage being applied to the gate electrodes of the first, second, and third transistors T1', T2', and T3', the first, second, and third transistors T1', T2', and T3' may be turned off, and in response to a gate-low voltage being applied to the gate electrodes of the first, second, and third transistors T1', T2', and T3', the first, second, and third transistors T1', T2', and T3' may be turned on. Accordingly, the phase of a scan signal SC' applied to a scan line SL' connected to the gate electrode of the second transistor T2' may be opposite to the phase of the scan signal SC of FIG. 4, and the phase of an emission signal VIN' applied to an emission line EL' connected to the gate electrode of the third transistor T3' may be opposite to the phase of the emission signal VI of FIG. 4.

The voltage applied to a first node N1' may vary depending on the capacitance of a sensing capacitor CF' generated by touch input from the user. Accordingly, the voltage applied to the gate electrode of the first transistor T1' and a drain-source current Ids' of the first transistor T1' may also vary. A read-out line RL' can sense these variations and can thus recognize a fingerprint.

A fingerprint recognition device according to another exemplary embodiment of the present inventive concept will hereinafter be described. In FIGS. 1 through 16, like reference numerals may indicate like elements, and thus, detailed descriptions thereof will be omitted. The fingerprint recognition device according to another exemplary embodiment of the present inventive concept will hereinafter be described, focusing mainly on differences with the fingerprint recognition device 200.

Figure 13:
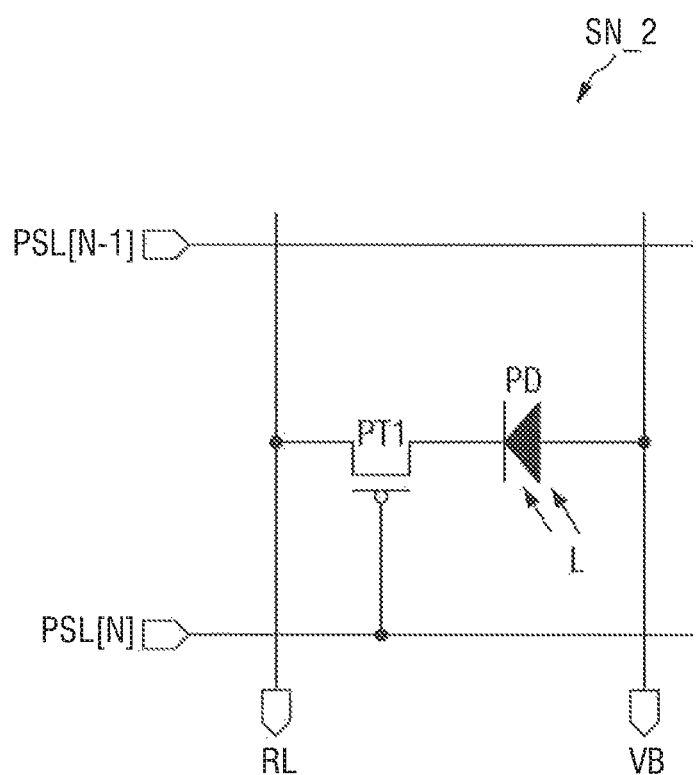
FIG. 13 is a circuit diagram of an optical fingerprint sensor according to an exemplary embodiment of the present inventive concept.
Figure 14:
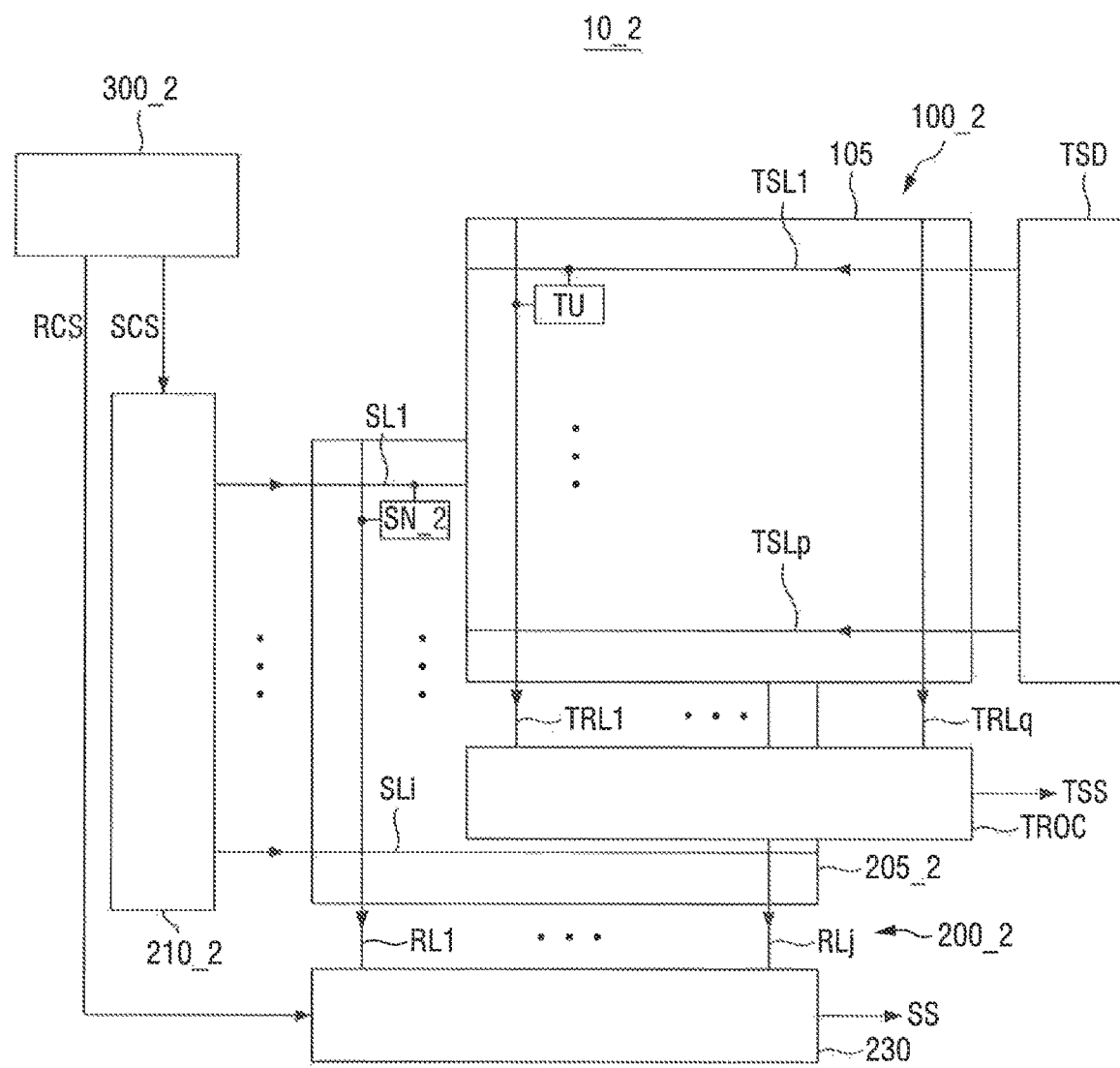
FIG. 14 is a block diagram of a display device including the fingerprint sensor of FIG. 13.
Figure 15:
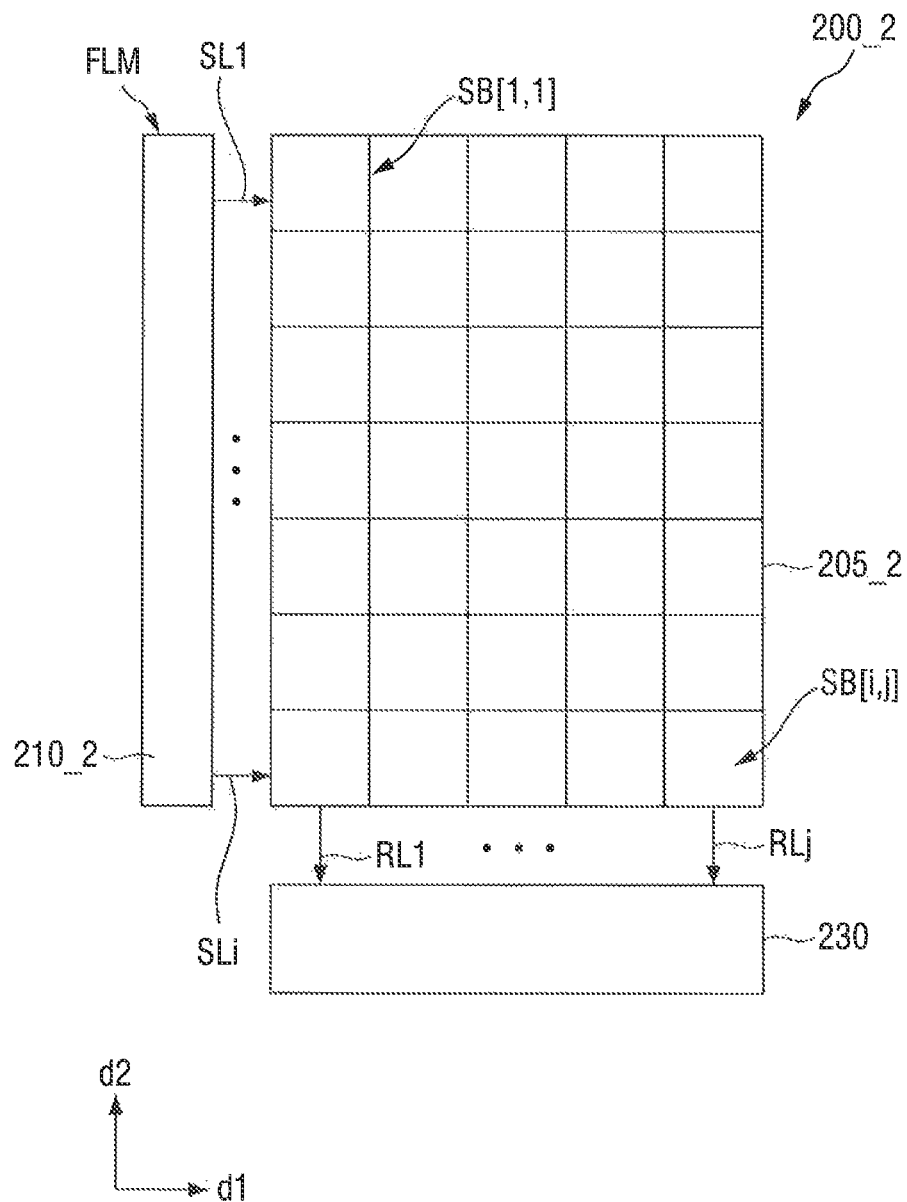
FIG. 15 is a block diagram of a fingerprint recognition device including the optical fingerprint sensor of FIG. 13.

FIG. 13 is a circuit diagram of an optical fingerprint sensor according to another exemplary embodiment of the present inventive concept. FIG. 14 is a block diagram of a display device including the optical fingerprint sensor of FIG. 13. FIG. 15 is a block diagram of a fingerprint recognition device including the optical fingerprint sensor of FIG. 13.

The exemplary embodiment of FIGS. 13 through 15 differs from the exemplary embodiment of FIGS. 1 through 4 in that optical fingerprint sensors are used. The exemplary embodiment of FIGS. 13 through 15 will hereinafter be described, focusing mainly on the difference with the exemplary embodiment of FIGS. 1 through 4.

FIG. 13 is a circuit diagram of an optical fingerprint sensor. Referring to FIG. 13, an optical sensor SN_2 may include a photoelectric conversion element PD.

The optical sensor SN_2 may be an optical fingerprint sensor capable of recognizing a fingerprint by sensing light reflected from fingerprint ridges and valleys with an image sensor. The optical sensor SN_2 may include the photoelectric conversion element PD. For example, the photoelectric conversion element PD may be a photodiode, a phototransistor, a photogate, or a pinned photodiode. In the description that follows, it is assumed that the photoelectric conversion element PD is a photodiode.

The optical sensor SN_2 may have a "1 transistor-1 diode" structure including a single transistor PT1 and the photoelectric conversion element PD.

The optical sensor SN_2 senses light reflected by a different part of a finger and generates an electrical signal corresponding to the sensed light. The optical sensor SN_2 may generate an electrical signal corresponding to light reflected from a fingerprint ridge or a fingerprint valley. The amount of light sensed by the photoelectric conversion element PD may vary depending on the shape of a fingerprint, and electrical signals having different levels may be generated depending on the amount of light sensed by the photoelectric conversion element PD.

A drain-source current that passes through the channel of the transistor PT1 may vary depending on an electrical signal generated by the optical sensor SN_2. In response to a scan signal being applied via a scan line PSL[N], a fingerprint sensing signal SS may be scanned via a read-out line RL. In other words, an electrical signal from the optical sensor SN_2 may include contrast information or image information. The electrical signal may be processed to determine whether a part of a finger corresponding to the optical sensor SN_2 is a fingerprint ridge or a fingerprint valley, and a fingerprint image may be configured by combining the result of the determination. In FIG. 13, light sensed at the photoelectric conversion element PI) may be denoted by L, PSL[N−1] corresponds to a scan line and VB corresponds to a voltage line.

Referring to FIGS. 14 and 15, a display device 10_2 may include a display panel 100_2, a fingerprint recognition device 200_2, and a timing controller 300_2. The display panel 100_2 may include a plurality of touch sensing units TU, and the fingerprint recognition device 200_2 may include a plurality of optical fingerprint sensors SN_2.

The display panel 100_2, like the display panel 100 of FIG. 1, may include a plurality of pixels and may provide an image to the outside. The display panel 100_2 may be an OLED display panel including OLEDs. In the description that follows, it is assumed that the display panel 100_2 is an OLED display panel, but the present inventive concept is not limited thereto. Alternatively, the display panel 100_2 may be an LCD panel or an mLED) display panel.

The display panel 100_2 may include a touch sensing member 105. The touch sensing to member 105 may be continuously formed on the OLEDs of the display panel 100_2. For example, the OLEDs may be disposed on the display panel 100_2, and the touch sensing member 105 may be continuously formed on a passivation layer for protecting the OLEDs. However, the present inventive concept is not limited to this example. In another example, the touch sensing member 105 may be formed on a separate panel from the display panel 100_2.

The touch sensing member 105 may include a plurality of touch driving lines TSL, e.g., touch driving lines TSL1 through TSLp (where p is a positive integer of 2 or greater), a plurality of touch sensing lines TRL, e.g., touch sensing lines TRL1 through TRLq (where q is a positive integer of 2 or greater), and a plurality of touch sensing units TU. The touch driving lines TSL may be disposed to intersect the touch sensing lines TRL.

The touch sensing units TU may have a multilayer structure and may sense external output in a capacitive manner. Each of the touch sensing units TU may include a first conductive layer, a second conductive layer, and an insulating layer. One of the first and second conductive layers may be connected to one of the touch driving lines TSL and one of the touch sensing lines TRL, and the first and second conductive layers may be insulated from each other by the insulating layer. In other words, each of the touch sensing units TU may be connected to one of the touch driving lines TSL and one of the touch sensing lines TRL. In response to a touch input, the capacitance between the first and second conductive layers may vary, and such capacitance variations may be touch signals TSS.

A touch driving circuit unit TSI) may be connected to the touch driving lines TSL and may sequentially provide touch driving voltages to the touch sensing units TU. The touch driving circuit unit TSD may be connected to the timing controller 300_2 and may receive touch driving control signals.

A touch sensing circuit unit TROC may be connected to the touch sensing lines TRL. The touch sensing circuit unit TROC may sequentially provide the touch signals TSS, received from the touch sensing units TU, to the timing controller 300_2. The timing controller 300_2 may calculate the coordinates of a touch input based on the touch signals TSS. The touch sensing circuit unit TROC may receive touch sensing control signals from the timing controller 300_2.

The fingerprint recognition device 200_2 may include a sensing panel 205_2, a scan driving unit 210_2, a read-out circuit unit 230, and the timing controller 300_2.

The sensing panel 205_2 may be implemented as a semiconductor chip or a semiconductor package and may be attached to the bottom surface of the display panel 100_2. The sensing panel 205_2 may be a semiconductor layer with image sensors such as CMOS image sensors (CIS) or charge-coupled devices (CCDs) formed thereon.

The sensing panel 205__2, which includes the optical fingerprint sensors SN_2, detects a fingerprint of a finger that is placed in contact with, or adjacent to, the display panel 100_2. In a case where the display panel 100_2 is an OLED display panel and a fingerprint of a user is placed on the display panel 100_2, light from the OLEDs of the display panel 100_2 may be transmitted to, and reflected from, the fingerprint of the user, and the reflected light may be transmitted to the sensing panel 205_2 through pin holes of the display panel 100_2.

For example, a plurality of scan lines, e.g., first through i-th scan lines SL1 through SLi (where i is a positive integer of 2 or greater), a plurality of read-out lines, e.g., read-out lines RL1 through RLj (where j is a positive integer of 2 or greater), and the optical fingerprint sensors SN_2 may be disposed on the sensing panel 205_2. The scan lines SL1 through SLi may be disposed to intersect the read-out lines RL1 through RLj. Each of the optical fingerprint sensors SN_2 of the sensing panel 205_2 may be connected to one of the scan lines SL1 through SLi and one of the read-out lines RL1 through RLj.

The scan driving unit 210_2 may be connected to the scan lines SL1 through SLi and may provide a scan signal to the optical fingerprint sensors SN_2. The scan driving unit 210_2 may receive a scan control signal SCS from the timing controller 300_2. The scan control signal SCS may include an initiation signal FLM and may control the scan driving unit 210_2.

In response to a read-out control signal RCS being provided from the timing controller 300_2, the read-out circuit unit 230 may sequentially provide fingerprint sensing signals SS, received from the read-out lines RL1 through RLj, to the timing controller 300_2.

The fingerprint recognition device 200_2, which includes the optical fingerprint sensors SN_2, may not perform the area-driving fingerprint recognition method described above with reference to FIGS. 5A and 5B. In other words, the fingerprint recognition device 200_2 may not include an emission driving unit for performing the area-driving fingerprint recognition method. The fingerprint recognition device 200_2 may only include the scan driving unit 210_2 and may sense signals according to the line-driving fingerprint recognition method.

FIG. 15 shows that the sensing panel 205_2 is divided into a plurality of sensing blocks SB. For convenience, only some of the scan lines SL1 through SLi and only some of the read-out lines RL1 through RLj are illustrated in FIGS. 14 and 15.

The fingerprint recognition device 2002, like the fingerprint recognition device 200 of FIG. 2, may be divided into a plurality of sensing blocks SB, e.g., sensing blocks SB[1,1] through SB[i,j]. Each of the sensing blocks SB may include multiple optical fingerprint sensors SN_2, and the sensing blocks SB may be arranged on the sensing panel 205_2 in rows and columns. Initiation signal lines may be disposed to correspond to the sensing blocks SB. The initiation signal lines may transmit the initiation signal FLM, provided by the timing controller 300_2, to the scan driving unit 210_2, which corresponds to the sensing blocks SB.

Each of the scan lines SL1 through SL1 and each of the read-out lines RL1 through RLj are illustrated as being single lines connected to one of the sensing blocks SB, but may actually be groups of lines connected to multiple optical fingerprint sensors SN_2 included in one of the sensing blocks SB.

The fingerprint recognition device 200_2, which includes the optical fingerprint sensors SN_2, may be driven in a fingerprint recognition mode and in an average recognition mode. The fingerprint recognition mode may be as described above with reference to FIGS. 9 and 10, and the average recognition mode may be similar to the driving method described above with reference to FIG. 11.

In the fingerprint recognition mode, the scan driving unit 210_2 may receive the initiation signal FLM from the timing controller 300_2. The fingerprint recognition device 200_2 may include the initiation signal lines corresponding to the sensing blocks SB. In other words, by providing the initiation signal FLM only to a sensing block SB that needs to be sensed, fingerprint information can be sensed from just the sensing block SB that needs to be sensed.

As mentioned above, in response to a touch input being generated, the touch sensing circuit unit TROC may receive the touch signals TSS from the touch sensing units TU and may provide the touch signals TSS to the timing controller 300_2. The timing controller 300_2 may detect the touch coordinates of the touch input based on the touch signals TSS and may provide the initiation signal FLM only to a scan driver corresponding to a row including a sensing block SB that corresponds to the touch coordinates of the touch input. In other words, the timing controller 300_2 may selectively provide the initiation signal FLM only to a scan driver corresponding to the detected touch coordinates. The scan driver to which the initiation signal FLM is provided may sequentially provide a scan signal to the optical fingerprint sensors SN_2. The read-out circuit unit 230 may scan fingerprint sensing signals SS via the read-out lines RL1 through RLj.

The fingerprint recognition device 200_2 may control the number of sensing blocks SB that need to be sensed for fingerprint recognition via the timing controller 300_2. In other words, the timing controller 300_2 may provide the initiation signal FLM not only to the scan driver corresponding to the detected touch coordinates, but also to scan drivers adjacent to the scan driver corresponding to the detected touch coordinates.

For example, if each of the sensing blocks SB is 4 mm long in a vertical direction, an 8-mm long fingerprint recognition area can be secured by driving two rows of sensing blocks SB or a 12-mm long fingerprint recognition area can be secured by driving three rows of sensing blocks SB.

The fingerprint recognition device 200_2, which includes the optical fingerprint sensors SN_2, may be driven in the average recognition mode. In the average recognition mode, the fingerprint recognition device 200_2 may be driven in a similar manner to that described above with reference to FIG. 11. In the average recognition mode, the timing controller 300_2 may provide the initiation signal FLM to the scan drivers of the scan driving unit 210 at the same time. In response to the initiation signal FLM being provided to the scan drivers of the scan driving unit 210 at the same time, all the optical fingerprint sensors SN_2 included in each of the sensing blocks SB may be simultaneously provided with a scan signal.

In the average recognition mode, the fingerprint recognition device 200_2, which includes the optical fingerprint sensors SN_2, can measure the average amount of light provided to each of the sensing blocks SB, and the result of the measurement may be used to tune and adjust the dynamic range and the offset of the read-out circuit unit 230. Accordingly, the signal-to-noise ratio (SNR) of the fingerprint recognition device 200_2 can be raised, and as a result, the reliability of the fingerprint recognition device 200_2 can be increased. In addition, in the case of using the fingerprint recognition device 200_2 to perform liveness detection for anti-spoofing purposes, variations in the amount of light sensed, rather than individual sensor information, needs to be monitored. Therefore, the fingerprint recognition device 200_2 can quickly and precisely measure such variations using the average recognition mode. Moreover, in the case of using the fingerprint recognition device 200_2 as an illumination sensor, the fingerprint recognition device 200_2 can quickly and precisely measure the amount of light using the average recognition mode.

Figure 16:
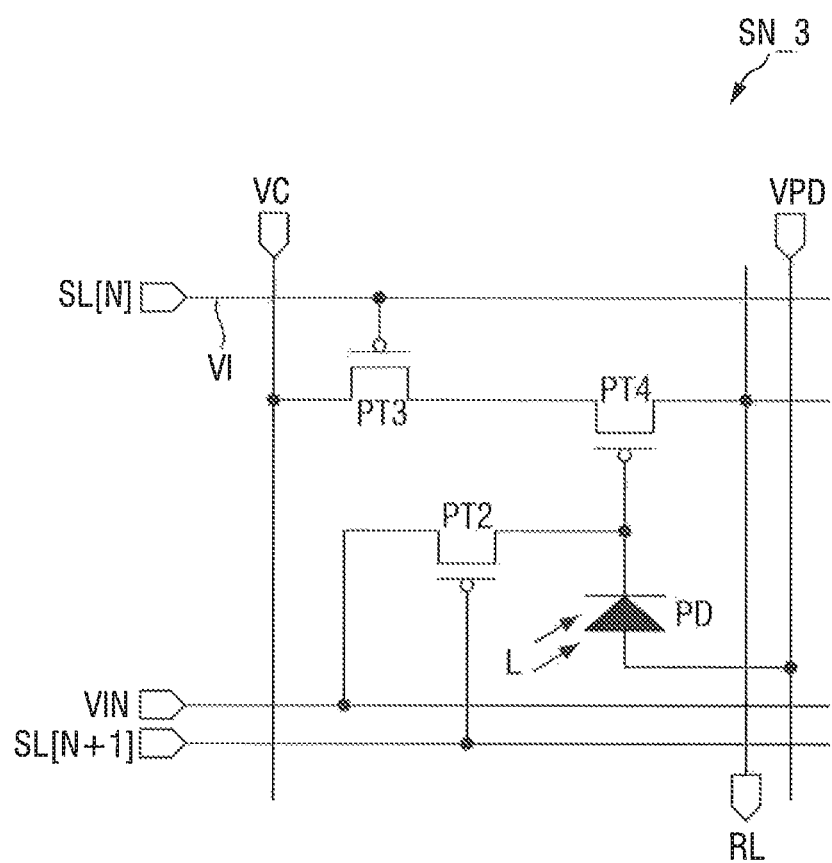
FIG. 16 is a circuit diagram of an optical fingerprint sensor according to another exemplary embodiment of the present inventive concept.

FIG. 16 is a circuit diagram of an optical fingerprint sensor according to an exemplary embodiment of the present inventive concept.

An optical fingerprint sensor SN_3 of FIG. 16 differs from the optical fingerprint sensor SN_2 of FIG. 13 in that it includes three transistors PT2, PT3 and PT4 and a photoelectric conversion element PD. In other words, the optical fingerprint sensor SN_3 of FIG. 16 may have a "3 transistors-1 diode" structure. The operation of the optical fingerprint sensor SN_3 of FIG. 16 is almost the same as the operation of the optical fingerprint sensor SN_2 of FIG. 13, and thus, a detailed description thereof will be omitted. In FIG. 16, light sensed at the photoelectric conversion element PD may be denoted by L, SL[N] and SL[N+1] correspond to scan lines, and VIN, VC and VPD correspond to voltage lines.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A fingerprint recognition device, comprising:
a sensing panel including a plurality of sensing blocks, wherein each of the sensing blocks includes a plurality of sensors;
a scan driving unit configured to provide a scan signal to the sensors; and
a timing controller configured to provide an initiation signal to the scan driving unit, wherein
each of the sensors includes a photoelectric conversion element,
the scan driving unit includes scan drivers that correspond to rows of the sensing blocks, each of the scan drivers being driven only when the initiation sign is received thereby,
in a first mode, the timing controller provides the initiation signal to the scan drivers at the same time, and
in a second mode, the timing controller provides the initiation signal to a scan driver corresponding to a sensing block where a touch input is generated.

2. The fingerprint recognition device of claim 1, wherein in the second mode, the scan driving unit receives the initiation signal and sequentially provides the scan signal to the sensors.

3. The fingerprint recognition device of claim 2, wherein the timing controller receives a touch signal from a touch sensing unit, detects touch coordinates from the touch signal, and provides the initiation signal only to a scan driver corresponding to a sensing block that corresponds to the detected touch coordinates.

4. The fingerprint recognition device of claim 3, wherein the touch sensing unit is disposed on a display panel, and the sensing panel is attached to a bottom of the display panel.

5. The fingerprint recognition device of claim 4, wherein the timing controller provides the initiation signal to at least one scan driver adjacent to the scan driver corresponding to the sensing block that corresponds to the detected touch coordinates.

6. The fingerprint recognition device of claim 2, wherein in the first mode, the scan driving unit provides the scan signal to the sensors at the same time.

7. The fingerprint recognition device of claim 1, wherein no carry signal connection exists between the scan drivers.

* * * * *